United States Patent
Bae et al.

(10) Patent No.: US 12,363,445 B2
(45) Date of Patent: Jul. 15, 2025

(54) PROJECTING DEVICE AND METHOD FOR RECOGNIZING OBJECT WITH IMAGE PROJECTION

(71) Applicant: SAMSUNG ELECTRONICS CO., LTD., Suwon-si (KR)

(72) Inventors: Jungkweon Bae, Suwon-si (KR); Myungho Kim, Suwon-si (KR); Changmin Keum, Suwon-si (KR); Junghyun Byun, Suwon-si (KR); Seokjae Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 169 days.

(21) Appl. No.: 18/228,292

(22) Filed: Jul. 31, 2023

(65) Prior Publication Data
US 2024/0107176 A1    Mar. 28, 2024

Related U.S. Application Data

(63) Continuation of application No. PCT/KR2023/009960, filed on Jul. 12, 2023.

(30) Foreign Application Priority Data

Sep. 22, 2022  (KR) .......................... 10-2022-0120256
Dec. 12, 2022  (KR) .......................... 10-2022-0173049

(51) Int. Cl.
*H04N 5/335*    (2011.01)
*G03B 7/18*     (2021.01)
(Continued)

(52) U.S. Cl.
CPC .............. *H04N 23/74* (2023.01); *G03B 7/18* (2013.01); *G06V 10/751* (2022.01);
(Continued)

(58) Field of Classification Search
CPC ....................................................... G03B 17/54
See application file for complete search history.

(56) References Cited

U.S. PATENT DOCUMENTS 4,430,526 A  *  2/1984  Brown ................ G06F 3/03545
                                                     235/462.49
6,819,782 B1    11/2004  Imagawa et al.
(Continued)

FOREIGN PATENT DOCUMENTS

EP          3896645 A1    10/2021
JP       2008-118609 A     5/2008
(Continued)

OTHER PUBLICATIONS

International Search Report (PCT/ISA/210) and Written Opinion (PCT/ISA/237) issued by the International Searching Authority on Oct. 18, 2023 in International Application No. PCT/KR2023/009960.

*Primary Examiner* — Gary C Vieaux
(74) *Attorney, Agent, or Firm* — Sughrue Mion, PLLC

(57) ABSTRACT

A projecting device includes a light source configured to output an image light; a projection lens configured to externally project the image light; a camera configured to photograph an object positioned between the camera and an external projection surface of the image light that is projected; a light blocker configured to block the image light output by the light source during a blocking period; and at least one processor configured to: obtain illuminance information regarding illuminance of the external projection surface, set the blocking period during which the image light output by the light source is blocked, based on the illuminance information, set a photographing period within the blocking period, control the light blocker to block the image light output by the light source during the blocking period,
(Continued)

and control the camera to photograph the object during the photographing period.

20 Claims, 14 Drawing Sheets

(51) Int. Cl.
*G06V 10/75* (2022.01)
*G06V 40/10* (2022.01)
*H04N 23/55* (2023.01)
*H04N 23/71* (2023.01)
*H04N 23/74* (2023.01)
*H04N 23/75* (2023.01)

(52) U.S. Cl.
CPC ........... *G06V 40/107* (2022.01); *H04N 23/55* (2023.01); *H04N 23/71* (2023.01); *H04N 23/75* (2023.01)

(56) References Cited

U.S. PATENT DOCUMENTS

| | | | |
|---|---|---|---|
| 7,284,864 B2 | 10/2007 | Kobori et al. | |
| 7,503,658 B2 * | 3/2009 | Hu | G06F 3/0425 353/121 |
| 9,462,255 B1 | 10/2016 | Marason et al. | |
| 9,484,005 B2 | 11/2016 | Rezaiifar et al. | |
| 9,569,892 B2 | 2/2017 | Diaz Spindola et al. | |
| 10,965,102 B2 | 3/2021 | Na et al. | |
| 11,006,066 B2 | 5/2021 | Ichieda | |
| 11,381,753 B2 | 7/2022 | Kimura | |
| 11,422,444 B2 | 8/2022 | Tamura et al. | |
| 2005/0110964 A1 * | 5/2005 | Bell | G06F 3/0428 353/122 |
| 2008/0106619 A1 | 5/2008 | Sumiya | |
| 2015/0085155 A1 | 3/2015 | Diaz Spindola et al. | |
| 2020/0014864 A1 | 1/2020 | Kang | |

FOREIGN PATENT DOCUMENTS

| | | | |
|---|---|---|---|
| JP | 4332649 B2 | 9/2009 | |
| JP | 7062751 B2 | 5/2022 | |
| JP | 7081582 B2 | 6/2022 | |
| JP | 7167503 B2 | 11/2022 | |
| KR | 10-2392751 B1 | 4/2022 | |
| KR | 10-2546319 B1 | 6/2023 | |
| WO | 2019/167527 A1 | 9/2019 | |

* cited by examiner

PROJECTING DEVICE AND METHOD FOR RECOGNIZING OBJECT WITH IMAGE PROJECTION

CROSS-REFERENCE TO RELATED APPLICATIONS

This application is a continuation application of International Application No. PCT/KR2023/009960, filed on Jul. 12, 2023, which is based on and claims priority to Korean Patent Application No. 10-2022-0120256, filed on Sep. 22, 2022, and Korean Patent Application No. 10-2022-0173049, filed on Dec. 12, 2022, in the Korean Intellectual Property Office, the disclosures of which are incorporated by reference herein in their entireties.

BACKGROUND

1. Field

The disclosure relates to a method of recognizing an object with image projection and a projecting device performing the method. In more detail, various embodiments of the disclosure relate to a method of experiencing augmented reality (AR) via mutual interaction between an image and an object by simultaneously projecting the image via a projecting device and recognizing the object positioned on the image.

2. Description of Related Art

Augmented reality (AR) is a technology for overlaying and displaying a virtual image on a real-world object or a physical environment space of the real world. An AR projector projecting an image by using the AR technology may be used in everyday life.

The AR projector may not only project an image but may also recognize an object positioned on a projection surface of the image. The AR projector may provide an AR experience via mutual interaction between the projected image and the recognized object.

As the AR projector has to recognize the object on the projection surface of the image, the AR projector must correctly distinguish the image from the object. Also, the AR projector may easily recognize an object positioned in an environment with particular illuminance. That is, the AR projector may not easily recognize an image positioned in an environment with too dark illuminance or too bright illuminance, according to illuminance changes. Accordingly, there is a demand for correctly recognizing an object positioned on a projection surface of an image, regardless of environment illuminance changes.

SUMMARY

Provided is a projecting device for recognizing an object with image projection.

According to an aspect of the disclosure, a projecting device configured to recognize an object with image projection, includes: a light source configured to output an image light; a projection lens configured to externally project the image light; a camera configured to photograph an object positioned between the camera and an external projection surface of the image light that is projected; a light blocker configured to block the image light output by the light source during a blocking period; and at least one processor configured to control operations of the light source, the camera, and the light blocker, wherein the at least one processor is further configured to: obtain illuminance information regarding illuminance of the external projection surface, set the blocking period during which the image light output by the light source is blocked, based on the illuminance information, set a photographing period within the blocking period, control the light blocker to block the image light output by the light source during the blocking period, and control the camera to photograph the object during the photographing period.

According to an aspect of the disclosure, a method of recognizing an object with image projection, includes: obtaining illuminance information regarding illuminance of an external projection surface of a projected image light; setting a blocking period during which an output image light is blocked, based on the illuminance information; setting a photographing period within the blocking period; blocking the output image light during the blocking period; and photographing the object positioned on the external projection surface during the photographing period.

According to an embodiment of the disclosure, provided is a computer-readable recording medium having recorded thereon a program for executing the method, on a computer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
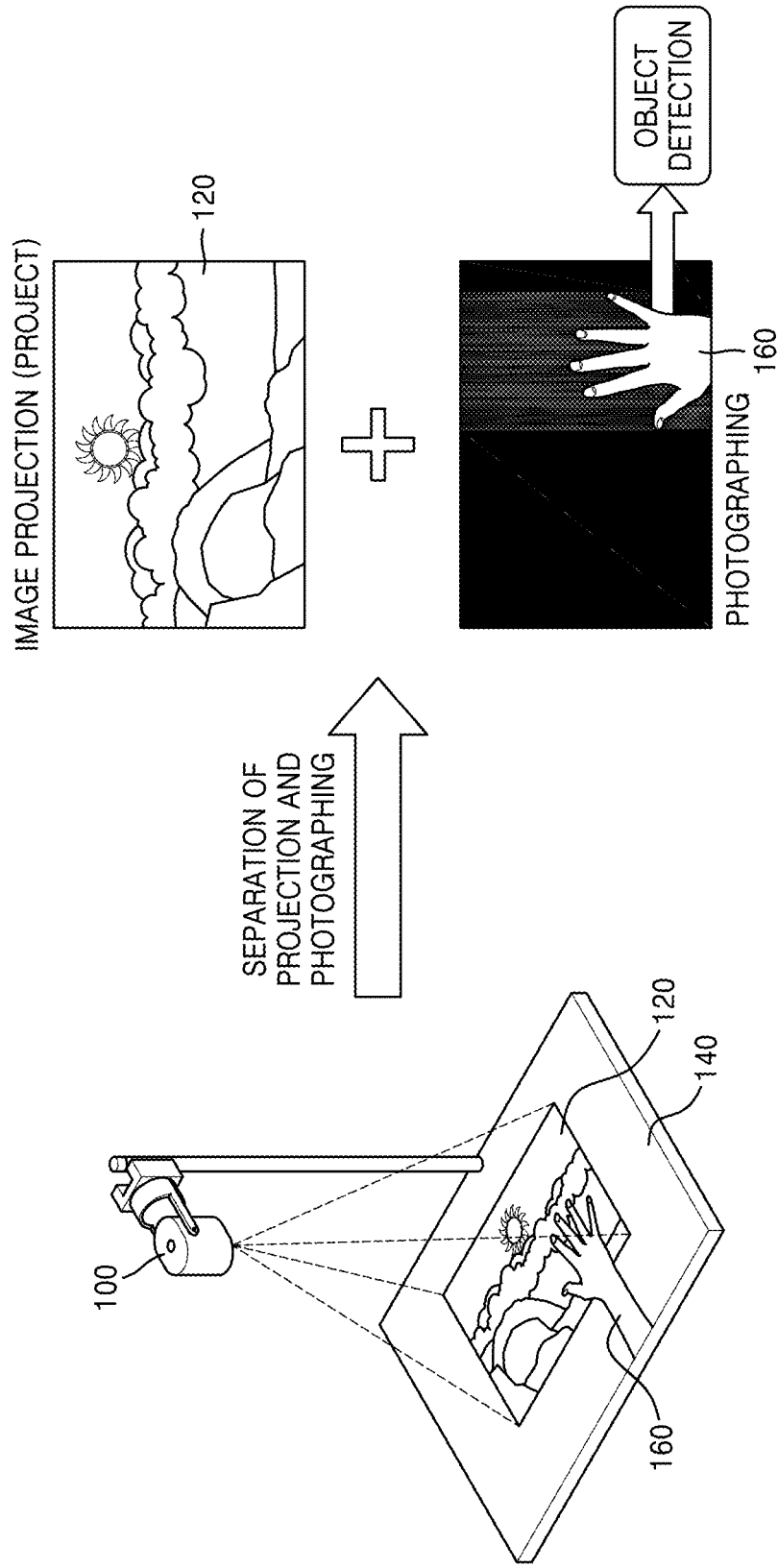
FIG. 1 illustrates a conceptual diagram of an operation in which a projecting device simultaneously projects an image and recognizes an object, according to an embodiment of the disclosure.

Throughout the disclosure, the expression "at least one of a, b, or c" indicates only a, only b, only c, both a and b, both a and c, both b and c, or all of a, b, and c.

All terms including descriptive or technical terms which are used in embodiments of the disclosure should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Therefore, the terms used in the disclosure should not be interpreted based on only their names but have to be defined based on the meaning of the terms together with the descriptions throughout the specification.

As used herein, the singular forms are intended to include the plural forms as well, unless the context clearly indicates otherwise. All terms including descriptive or technical terms which are used herein should be construed as having meanings that are obvious to one of ordinary skill in the art.

Throughout the disclosure, when a part "includes" or "comprises" an element, unless there is a particular description contrary thereto, the part may further include other elements, not excluding the other elements. As used in the specification, the term "unit" or "module" denotes an entity for performing at least one function or operation, and may be implemented as hardware, software, or a combination of hardware and software.

The expression "configured to" used in the disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "system configured to" may mean that the system, together with other devices or components, "is able to". For example, the phrase "processor adapted (or configured) to perform A, B, and C" may mean a dedicated processor (e.g., embedded processor) only for performing the corresponding operations or a general-purpose processor (e.g., central processing unit (CPU) or application processor (AP)) that can perform the corresponding operations by executing one or more software programs stored in a memory.

In addition, in the disclosure, when an element is referred to as being "connected to" another element, it is to be understood that the element may be directly connected to the other element, but may be connected or connected via another element in the middle, unless otherwise described.

Hereinafter, the disclosure will now be described more fully with reference to the accompanying drawings for one of ordinary skill in the art to be able to perform embodiments of the disclosure without difficulty. The disclosure may, however, be embodied in many different forms and should not be construed as being limited to the embodiments of the disclosure set forth herein.

Hereinafter, embodiments of the disclosure will be described in detail with reference to the drawings.

FIG. 1 illustrates a conceptual diagram of an operation in which a projecting device simultaneously projects an image and recognizes an object, according to an embodiment of the disclosure.

Referring to FIG. 1, a projecting device 100 according to an embodiment of the disclosure may project an image.

The projecting device 100 may include a projector to project an image. In the disclosure, the projector may include a light source unit and a projection lens. In addition, a detailed configuration of the projecting device 100 will be described with reference to FIG. 9, and an operation of the projecting device 100 will now be described with reference to FIG. 1.

The projecting device 100 may output an image light by using the light source unit. The image light output by the light source unit may be a white light. The projecting device 100 may externally project, by using the projection lens, the image light output by the light source unit. The image light that is externally projected by the projecting device 100 may indicate an image 120 projected by the projecting device 100. That is, the projecting device 100 may project the image 120 by using the light source unit and the projection lens.

However, the projecting device 100 may project the image 120 by using more or other elements, and a configuration of the projecting device 100 is not limited to the light source unit and the projection lens.

According to an embodiment of the disclosure, the projecting device 100 may further include a camera to photograph an object 160 positioned with respect to an external projection surface 140 of an image light that is projected. In other words, the object 160 may be positioned on the external projection surface 140 as shown, e.g., in FIG. 1. The projecting device 100 may obtain an object image including the object 160, by using the camera. The object image may be an image including the object 160 positioned with respect to the external projection surface 140.

The AR projector 100 may obtain an object image by using an RGB camera, but this is merely an example, and the disclosure is not limited thereto. For example, the projecting device 100 may obtain an object image by using one of a stereo camera, an infrared (IR) camera, an RGB-depth (RGB-D) and a Time-of-Flight (ToF) camera.

In the disclosure, the external projection surface 140 may be a surface on which an image light is projected via the projection lens of the projecting device 100.

In the disclosure, the object 160 positioned with respect to the external projection surface 140 may be: the object 160 positioned in contact with the external projection surface 140; the object 160 positioned on the external projection surface 140; and the object 160 positioned between the external projection surface 140 and the camera and thus is positioned in an area on which an image is projected.

According to an embodiment of the disclosure, the projecting device 100 may perform an operation of projecting the image 120 and an operation of photographing the object 160. The operation of projecting the image 120 and the operation of photographing the object 160 may not be simultaneously performed but may be separate.

According to an embodiment of the disclosure, the projecting device 100 may set a photographing period and a projection period. The projecting device 100 may control the camera to photograph the object 160 during the photographing period. The projecting device 100 may control the light source unit and the projection lens to project an image during the projection period. The photographing period and the projection period may not overlap.

According to an embodiment of the disclosure, the projecting device 100 may detect an object, based on the object image including the object 160. The projecting device 100 may detect the object 160 included in the object image, by using an object detection algorithm.

For example, as illustrated, the object 160 positioned with respect to the external projection surface 140 may be a hand. When the projecting device 100 includes the stereo camera, the projecting device 100 may detect the hand by using a hand skeleton detection and tracking technique, and may further recognize a three-dimensional pose of the hand via depth information.

The hand skeleton detection and tracking technique is a technique of detecting a moving joint part on a hand image of a person, segmenting a predetermined skeleton structure, and then projecting an image of the segmentation. A skeleton structure of a human hand may include end points (5) of fingers, joint points (5*3=15) of the fingers, a palm point (1), and a wrist point (1), but the disclosure is not limited thereto.

That is, according to an embodiment of the disclosure, the projecting device 100 may recognize a hand by using the hand skeleton detection and tracking technique, may track a hand skeleton via joint points of fingers, a palm point, and a wrist point, and thus, may particularly recognize hand motions such as touch, sweeping, pinch, or the like.

Figure 2:
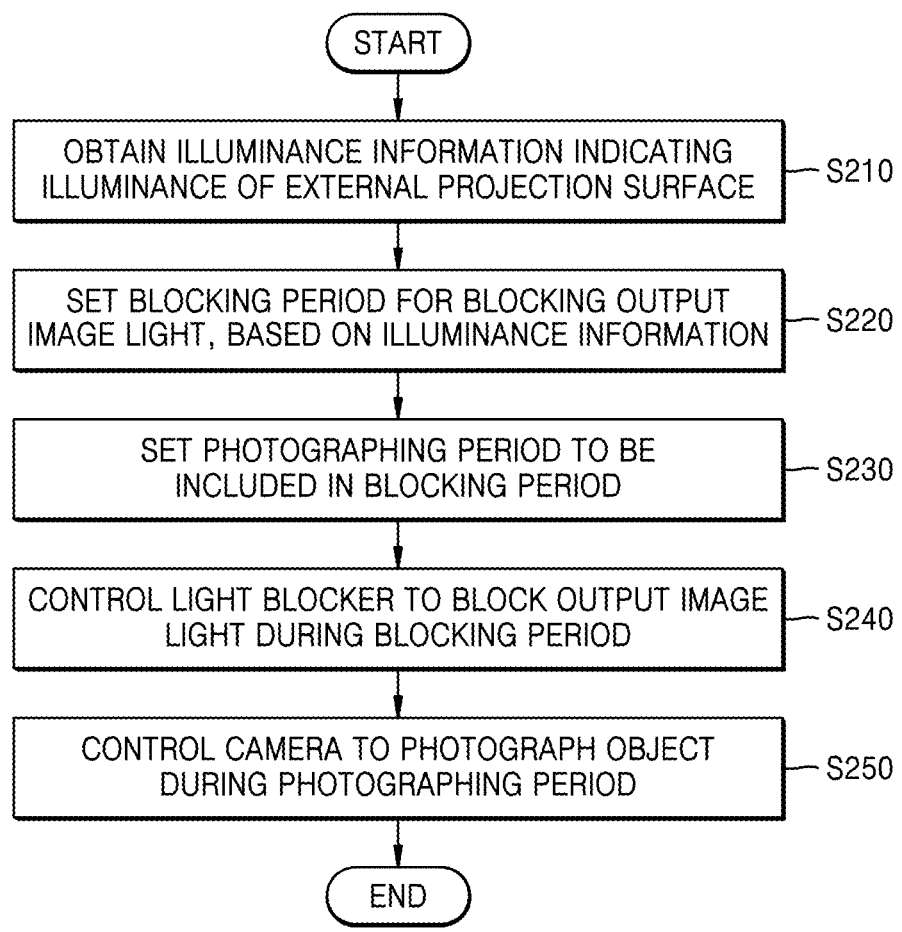
FIG. 2 illustrates a flowchart of an operating method of a projecting device according to an embodiment of the disclosure.

FIG. 2 illustrates a flowchart of an operating method of a projecting device according to an embodiment of the disclosure. For convenience, those elements overlapping with the descriptions of FIG. 1 are briefly described.

Referring to FIG. 2, in operation S210, the projecting device may obtain illuminance information indicating illuminance of an external projection surface.

According to an embodiment of the disclosure, the projecting device may further include an illuminance sensor to measure an illuminance of the external projection surface. The projecting device may measure illuminance of the external projection surface by using the illuminance sensor.

However, that the projecting device includes the illuminance sensor for obtaining illuminance information is merely an example, and a method of obtaining illuminance information is not particularly limited. For example, the projecting device may obtain an object image with respect to the external projection surface by using a camera, may calculate illuminance of the external projection surface, based on the object image with respect to the external projection surface, and thus, may obtain the illuminance information.

In operation S220, the projecting device may set a blocking period for blocking an output image light, based on the illuminance information.

According to an embodiment of the disclosure, the projecting device may project an image by using a light source unit and a projection lens. The projecting device may further include a light blocker, and may set the blocking period in which an image light output from the light source unit is blocked by controlling the light blocker.

In the disclosure, that the image light output from the light source unit is blocked may mean that an image is not projected from the projecting device. That is, the blocking period may indicate a period in which an image is not projected by the projecting device. In addition, a period in which an image is projected by the projecting device may be a projection period. The projection period may be a period excluding the blocking period and may not overlap the blocking period.

According to an embodiment of the disclosure, the projecting device may set the blocking period, based on the illuminance information. For example, as an interval of the blocking period increases as illuminance according to the illuminance information increases, a photographing period may increase, or as the blocking period decreases, an exposure time of the camera may increase. The projecting device may set the blocking period, based on the illuminance information, and thus, may control operations of the camera and a projector, in correspondence to environment illuminance changes.

According to an embodiment of the disclosure, the projecting device may set the blocking period, projection period and the photographing period so that a rate of the photographing period with respect to the projection period decreases as illuminance increases according to the illuminance information. That is, the projecting device may project an image and photograph an object according to the projection period and the blocking period which repeat in an alternate manner, however, when illuminance is bright, the projecting device may control the camera to frequently photograph an object.

In operation S230, the projecting device may set a photographing period to be included in the blocking period. The photographing period may be shorter than the blocking period.

According to an embodiment of the disclosure, a start point of the photographing period may match a start point of the blocking period. That is, the projecting device may control the camera to photograph an object positioned on an external projection surface when blocking of image projection by the projector starts.

In operation S240, the projecting device may control the light blocker to block an output image light during the blocking period. In operation S250, the projecting device may control the camera to photograph an object during the photographing period.

According to an embodiment of the disclosure, the projecting device may output an image light by using the light source unit. The projecting device may control the light blocker to block an output image light during the set blocking period. That is, the projecting device may not project an image on the external projection surface during the blocking period.

According to an embodiment of the disclosure, the projecting device may control the camera to photograph an object during the photographing period included in the blocking period. That is, the projecting device may photograph an object positioned on the external projection surface while an image is not projected.

The projecting device divides an operation of projecting an image and an operation of photographing an object, and thus, may obtain a clear object image including the object. The projecting device may recognize the object, based on the obtained clear object image. According to an embodiment of the disclosure, the operation of projecting an image and the operation of photographing an object may repeat very quickly so that human eyes cannot distinguish, and the projecting device may provide a user with an augmented reality (AR) image as if an object on a projected image is recognized, from a point of view of a user.

Figure 3:
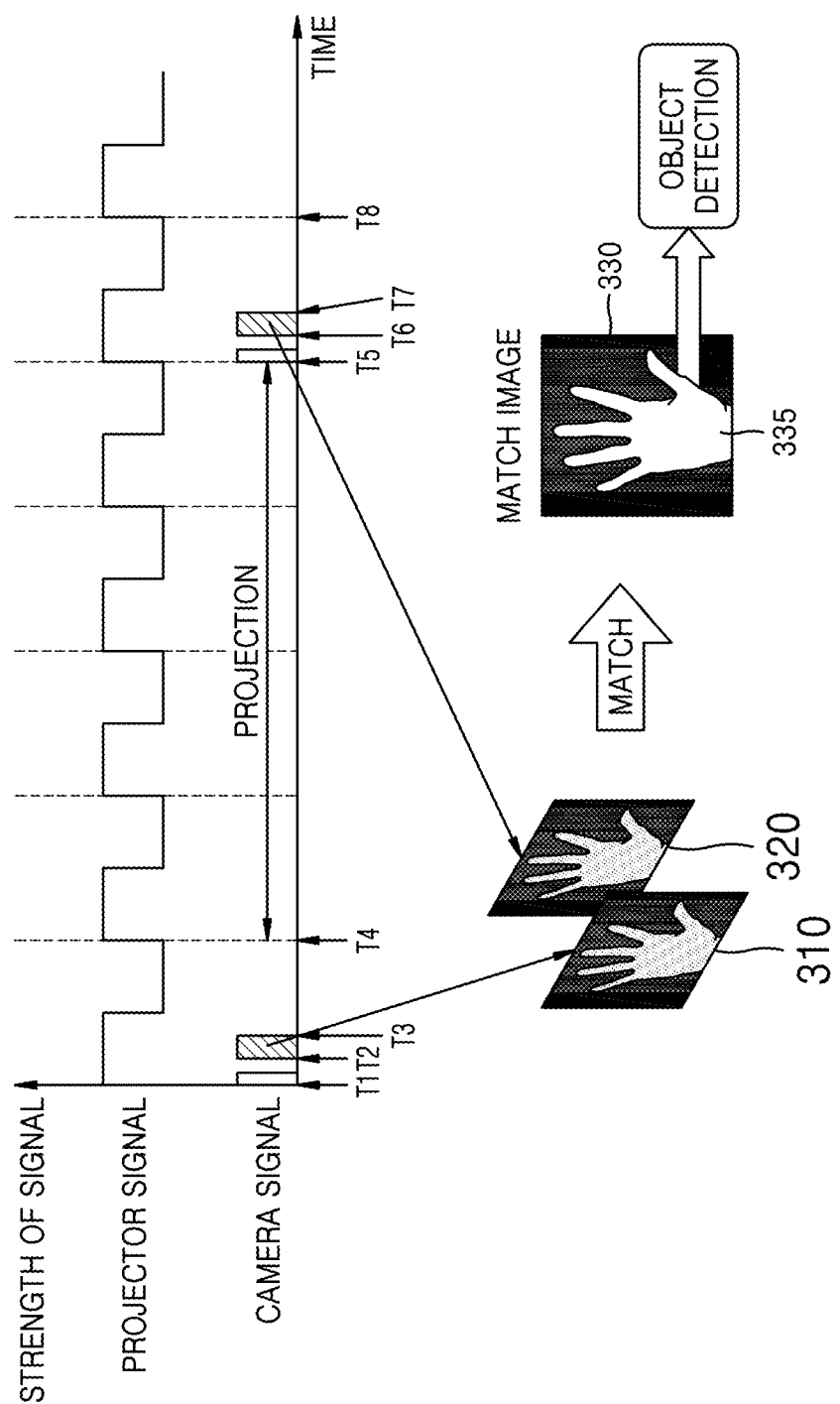
FIG. 3 illustrates an operation in which a projecting device recognizes an object by matching captured images when illuminance is dark, according to an embodiment of the disclosure.

FIG. 3 illustrates an operation in which a projecting device recognizes an object by matching captured images when illuminance is dark, according to an embodiment of the disclosure.

In addition, FIG. 3 illustrates separation between an operation of projecting an image and an operation of photographing an object, the operations being performed by the projecting device by comparing a projector signal with a camera signal. The projector signal and the camera signal may each indicate a clock signal that is a periodic signal used in synchronization.

Referring to FIG. 3, according to an embodiment of the disclosure, the projecting device may obtain the projector signal and the camera signal.

The projector signal may be a clock signal in which 1 and 0 are repeated according to a constant cycle. The projector signal may be a signal about a time point when the projecting device projects an image. The projecting device may periodically project an image, based on the projector signal. For example, the projecting device may periodically project an image, based on the projector signal, the image being generated by processing an image light output from the light source unit.

According to an embodiment of the disclosure, the projecting device may project an image whenever a projector signal is received. The projecting device may repeatedly project an image, based on a cycle of the projector signal. For example, the projecting device may repeatedly project an image, based on the projector signal having a frequency of 120 hertz (Hz). As another example, the projecting device may repeatedly project an image, based on the projector signal having a cycle of 8.3 millisecond (ms).

The camera signal may be a clock signal where 1 and 0 are repeated according to a constant cycle or may be a Transistor to Transistor Logic (TTL) signal composed of 1 and 0. The camera signal may be a signal indicating a time point when the projecting device photographs an object. The projecting device periodically photographs an object, based on the camera signal. For example, the projecting device may control, based on the camera signal, an operation of opening a shutter of the camera so as to photograph an object.

According to an embodiment of the disclosure, the projecting device may photograph an object after a lapse of a preset time from a time point T1 when a camera signal is obtained. The camera signal may refer to a signal for indicating a photographing operation of the camera. The preset time from the time point T1 when the camera signal is obtained may indicate a time requested for the light blocker to operate so that the projecting device can block image projection by using the light blocker. That is, as the light blocker is a mechanical element, the preset time may be requested for the projecting device to operate the light blocker after the projecting device receives the camera signal. For example, the preset time requested to operate the light blocker may be a time from the time point T1 to a second time point T2.

However, this is merely an example, and the disclosure is not limited thereto. For example, the projecting device may control the light blocker to block image projection as soon as the projecting device obtains the camera signal.

According to an embodiment of the disclosure, the projecting device may set the blocking period in which an image light output by the light source unit is blocked. The projecting device may set the blocking period to be repeated according to a preset interval. As illustrated, the blocking period may include a time from the second time point T2 to a fourth time point T4. Also, the blocking period may include a time from the sixth time point T6 to an eighth time point T8. Each blocking period may be a period of a same time. That is, the blocking period may include a period of a same time which is repeated according to a preset cycle.

According to an embodiment of the disclosure, the projecting device may control the light blocker to block an output image light during the blocking period. As the output image light is externally projected via the projection lens, the projecting device may project an image on an external projection surface. The projecting device may not project an image by controlling the light blocker to block an image light during the blocking period.

In addition, the projecting device may project an image during the projection period. The projecting device may project the image by controlling an output image light not to be blocked by the light blocker during the projection period. The projection period and the blocking period may not overlap. For example, the projection period may include a time from the fourth time point T4 to a fifth time point T5. Although not illustrated, the projection period may include a period of a same time which is repeated according to a preset cycle.

According to an embodiment of the disclosure, the projecting device may set a photographing period in which an object is photographed using a camera. As illustrated, the photographing period may include a time from the second time point T2 to a third time point T3. Also, the photographing period may include a time from a sixth time point T6 to a seventh time point T7. Each photographing period may be a period of a same time. That is, the photographing period may include a period of a same time which is repeated according to a preset cycle.

According to an embodiment of the disclosure, the photographing period may be included in the blocking period. The photographing period may indicate a period in which an aperture of the camera is open to achieve exposure for sensing light.

The projecting device may control the camera to photograph an object during the photographing period. That is, the projecting device may control the camera to open the aperture of the camera when the photographing period is started. The projecting device may sense light via the exposure and may generate an object image based on the sensed light, during the photographing period.

According to an embodiment of the disclosure, the projecting device may obtain a match image via the object image obtained during the photographing period. The projecting device obtains the match image when illuminance is dark, and thus, may obtain an image with appropriate illuminance. That is, the projecting device may obtain object images with dark illuminance during each photographing period, may match the obtained object images with dark illuminance, and thus, may obtain a match image with bright illuminance.

For example, the projecting device may obtain a first object image 310 during a first photographing period. Here, the first photographing period may indicate a photographing period from the second time point T2 to the third time point T3.

The projecting device may obtain a second object image 320 during a second photographing period. Here, the second photographing period may indicate a photographing period from the sixth time point T6 to the seventh time point T7.

The projecting device may obtain a match image 330 by matching the first object image 310 and the second object image 320. In the disclosure, matching may indicate an image conversion procedure for obtaining an image with bright illuminance by synthesizing images with dark illuminance. The image conversion method is not particularly limited.

According to an embodiment of the disclosure, illuminance of the match image 330 may be greater than illuminance of the first object image 310 and illuminance of the second object image 320.

While it is illustrated that the projecting device obtains the match image 330 by matching the first object image 310 and the second object image 320, the number of images requested for obtaining the match image 330 is not particularly limited. For example, the projecting device may obtain a match image by matching a first object image, a second object image, and a third object image.

According to an embodiment of the disclosure, the projecting device may detect an object 335, based on the match image 330 including the object 335. For example, as illustrated, the object 335 may be a hand of a user. However, this is merely an example, and the disclosure is not limited thereto.

The projecting device may use a deep learning-based object detection technology so as to detect the object 335 included in the match image 330. However, a method by which the projecting device recognizes the object 335 is not particularly limited.

Figure 4:
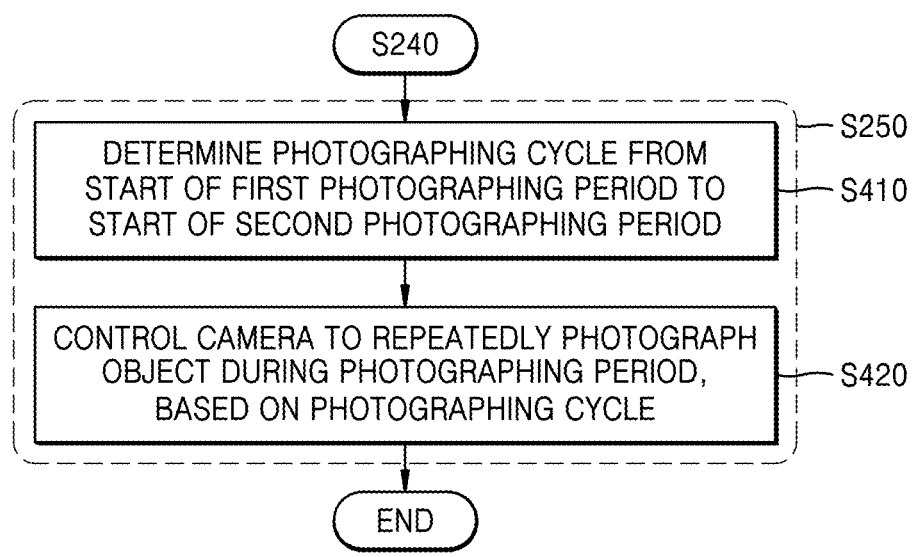
FIG. 4 illustrates a flowchart of an operating method by which a projecting device repeatedly captures an image including an object by using a photographing period, according to an embodiment of the disclosure.

FIG. 4 illustrates a flowchart of an operating method by which a projecting device repeatedly captures an image including an object by using a photographing period, according to an embodiment of the disclosure.

Referring to FIG. 4, according to an embodiment of the disclosure, operation S250 of FIG. 2 may include operation S410 and operation S420.

In operation S410, the projecting device may determine a photographing cycle from a start of a first photographing period to a start of a second photographing period. That is, the projecting device may determine the photographing cycle to allow a photographing period to be repeated at regular intervals.

In addition, referring to FIG. 3, the first photographing period may indicate a period from the second time point T2 to the third time point T3. The second photographing period may indicate a period from the sixth time point T6 to the seventh time point T7. The projecting device may determine a photographing cycle having a cycle from the second time point T2 to the sixth time point T6.

In operation S420, the projecting device may control the camera to repeatedly photograph an object during the photographing period, based on the photographing cycle.

According to an embodiment of the disclosure, the projecting device may obtain an object image including an object during the photographing period repeated at regular intervals, based on the determined photographing cycle. For example, the first photographing period and the second photographing period may be examples of photographing periods that are repeated at regular intervals. The projecting device may obtain a first object image including an object during the first photographing period. The projecting device may obtain a second object image including the object during the second photographing period.

According to an embodiment of the disclosure, the projecting device may detect the object, based on a plurality of object images obtained during the photographing period.

Figure 5:
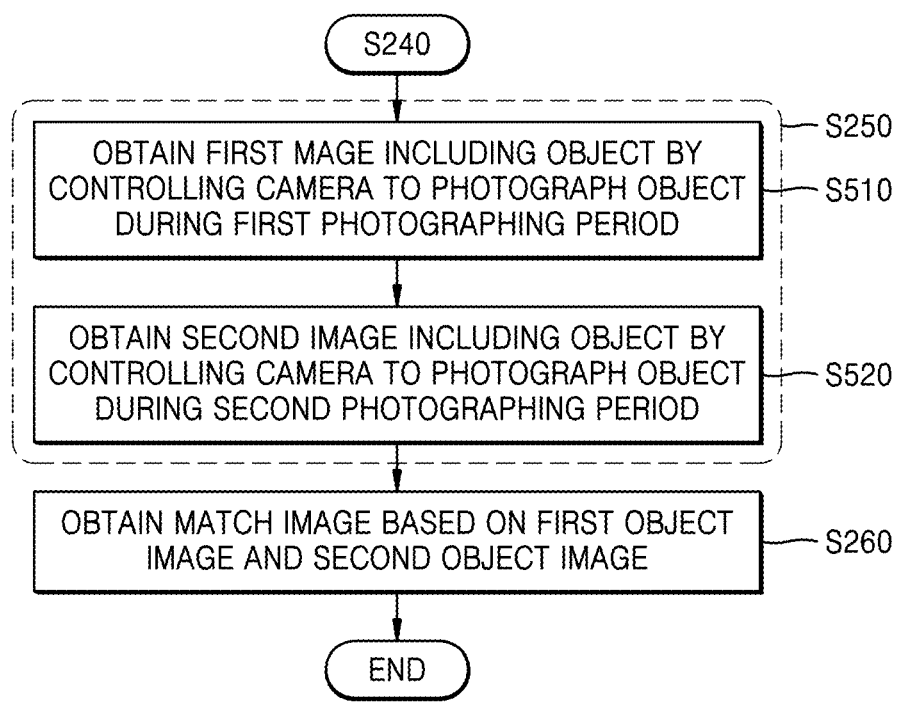
FIG. 5 illustrates a flowchart of an operating method by which a projecting device recognizes an object by matching captured images, according to an embodiment of the disclosure.

FIG. 5 illustrates a flowchart of an operating method by which a projecting device recognizes an object by matching captured images, according to an embodiment of the disclosure.

Referring to FIG. 5, according to an embodiment of the disclosure, operation S250 of FIG. 2 may include operation S510 and operation S520.

In operation S510, the projecting device may obtain a first object image including an object by controlling a camera to photograph an object during a first photographing period. In operation S520, the projecting device may obtain a second object image including the object by controlling the camera to photograph the object during a second photographing period.

According to an embodiment of the disclosure, the projecting device may obtain the first object image and the second object image both including the object during the first photographing period and the second photographing period that are not connected. For example, the projecting device may obtain the first object image during the first photographing period by exposing an aperture of the camera by opening the aperture. After obtaining the first object image, the projecting device may control the aperture of the camera to be closed. Afterward, the projecting device may obtain the second object image during the second photographing period by exposing the aperture of the camera by opening again the aperture.

In operation S260, the projecting device may obtain a match image based on the first object image and the second object image. However, the number of images requested for obtaining the match image is not particularly limited.

According to an embodiment of the disclosure, the projecting device may obtain the match image with bright illuminance by matching the first object image and the second object image. The illuminance of the match image may be greater than illuminance of the first object image and illuminance of the second object image. For example, the illuminance of the match image may be equal to a sum of the illuminance of the first object image and the illuminance of the second object image. However, this is merely an example, and the particular calculation equation of illuminance of the match image is not particularly limited.

According to an embodiment of the disclosure, the projecting device may detect the object, based on the match image.

Figure 6:
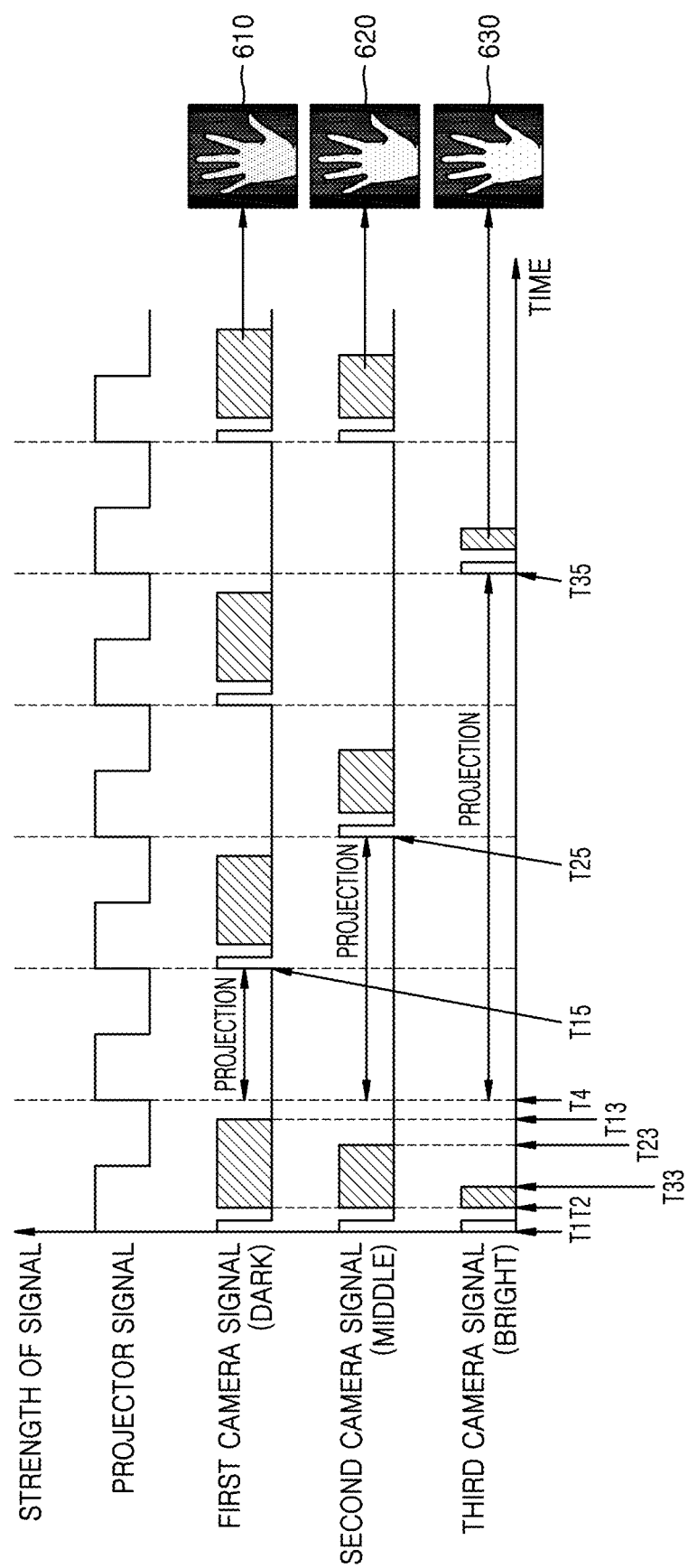
FIG. 6 illustrates a graph showing operations in which a projecting device photographs an object by using different photographing cycles according to illuminance, according to an embodiment of the disclosure.

FIG. 6 illustrates a graph showing operations in which a projecting device photographs an object by using different photographing cycles according to illuminance, according to an embodiment of the disclosure.

For convenience of descriptions, elements overlapping with the descriptions of FIG. 3 are briefly described or are not provided.

Referring to FIG. 6, according to an embodiment of the disclosure, the projecting device may obtain a projector signal and first, second, and third camera signals.

The first camera signal, the second camera signal, and the third camera signal may each be a clock signal or a TTL signal, in which 1 and 0 are repeated according to a constant cycle. In particular, the projecting device may obtain a camera signal having a different cycle, according to illuminance. The projecting device may periodically photograph an object, based on the first camera signal, the second camera signal, and the third camera signal.

As illustrated, the projecting device may obtain the first camera signal when illuminance is dark. The projecting device may obtain the second camera signal when illuminance is middle. The projecting device may obtain the third camera signal when illuminance is bright. In the disclosure, middle illuminance may indicate illuminance of a case where the illuminance is greater than illuminance of a case of obtaining the first camera signal and is lower than illuminance of a case of obtaining the third camera signal. That is, the case of the middle illuminance is relatively defined and thus is not particularly limited.

According to an embodiment of the disclosure, the projecting device may photograph an object after an elapse of a preset time from a time point T1 when a camera signal is obtained. Here, the camera signal may include the first camera signal, the second camera signal, and the third camera signal. The preset time may refer to a time from the first time point T1 to a second time point T2.

According to an embodiment of the disclosure, the projecting device may set a blocking period in which an image light output by a light source unit is blocked. The projecting device may set the blocking period to be repeated according to a preset interval. As illustrated, the blocking period may include a time from the second time point T2 to a fourth time point T4.

According to an embodiment of the disclosure, the projecting device may set a photographing period in which an object is photographed by using a camera. The photographing period may be included in the blocking period. Hereinafter, setting of the photographing period, a projection period, and a photographing cycle according to illuminance will now be described in detail.

According to an embodiment of the disclosure, the projecting device may determine a length of the photographing period according to illuminance. The projecting device may determine the length of the photographing period, based on illuminance information indicating illuminance of an external projection surface on which an image is projected. The projecting device may set the length of the photographing period to decrease as illuminance increases. That is, when illuminance is dark, the projecting device may set the photographing period such that exposure is maintained for a long time by opening an aperture of the camera for a long time.

For example, when illuminance is dark, the projecting device may photograph an object, based on the first camera signal. When illuminance is dark, the photographing period may include a time from the second time point T2 to a 1_3 time point T13. The projecting device may obtain a 1_1 object image 610 by photographing an object during the photographing period from the second time point T2 to the 1_3 time point T13.

When illuminance is middle, the projecting device may photograph the object, based on the second camera signal. When illuminance is middle, the photographing period may include a time from the second time point T2 to a 2_3 time point T23. The projecting device may obtain a 2_1 object image 620 by photographing the object during the photographing period from the second time point T2 to the 2_3 time point T23.

When illuminance is bright, the projecting device may photograph the object, based on the third camera signal. When illuminance is bright, the photographing period may include a time from the second time point T2 to a 3_3 time point T33. The projecting device may obtain a 3_1 object image 630 by photographing the object during the photographing period from the second time point T2 to the 3_3 time point T33.

The time from the second time point T2 to the 1_3 time point T13 may be longer than the time from the second time point T2 to the 2_3 time point T23. The time from the second time point T2 to the 2_3 time point T23 may be longer than the time from the second time point T2 to the 3_3 time point T33. That is, the projecting device may set the photographing period to decrease as illuminance increases.

According to an embodiment of the disclosure, when illuminance is dark, the projecting device may obtain the 1_1 object image 610 including the object. When illuminance is middle, the projecting device may obtain the 2_1 object image 620 including the object. When illuminance is bright, the projecting device may obtain the 3_1 object image 630 including the object.

Illuminance of the 1_1 object image 610 may be lower than illuminance of the 2_1 object image 620. The illuminance of the 2_1 object image 620 may be lower than illuminance of the 3_1 object image 630.

According to an embodiment of the disclosure, the projecting device may determine a length of the projection period according to illuminance. The projecting device may determine the length of the projection period, based on illuminance information indicating illuminance of an external projection surface on which an image is projected. The projecting device may set the length of the projection period to decrease as illuminance decreases. That is, when illuminance is dark, the projecting device decreases the projection period so that many object images for recognizing an object may be obtained in the projection period. The projecting device may obtain a match image with appropriate illuminance by matching the many object images. The projecting device may detect the object by using the match image.

For example, when illuminance is dark, the projecting device may project an image, based on the first camera signal. When illuminance is dark, the projection period may include a time from the fourth time point T4 to a 1_5 time point T15. The projecting device may project the image during the projection period from the fourth time point T4 to the 1_5 time point T15.

When illuminance is middle, the projecting device may project the image, based on the second camera signal. When illuminance is middle, the projection period may include a time from the fourth time point T4 to a 2_5 time point T25. The projecting device may project the image during the projection period from the fourth time point T4 to the 2_5 time point T25.

When illuminance is bright, the projecting device may project the image, based on the third camera signal. When illuminance is bright, the projection period may include a time from the fourth time point T4 to a 3_5 time point T35. The projecting device may project the image during the projection period from the fourth time point T4 to the 3_5 time point T35.

The time from the fourth time point T4 to the 1_5 time point T15 may be shorter than the time from the fourth time point T4 to the 2_5 time point T25. The time from the fourth time point T4 to the 2_5 time point T25 may be shorter than the time from the fourth time point T4 to the 3_5 time point T35. That is, the projecting device may set the projection period to decrease as illuminance decreases.

According to an embodiment of the disclosure, the projecting device may set the length of the photographing period to decrease as illuminance increases. The projecting device may set the length of the projection period to increase as illuminance increases. Consequently, the projecting device may set the projection period and the photographing period so that a rate of the projection period to the photographing period decreases as illuminance according to the illuminance information increases.

According to an embodiment of the disclosure, the photographing period may be shorter than the projection period. The projecting device may repeatedly project an image during the projection period. The projecting device may repeatedly project the image so as to make the projected image look seamless to human eyes. Therefore, the projecting device may set a minimum photographing period and an efficient projection period so as to make a gap between the projection periods unobservable to human eyes.

Figure 7:
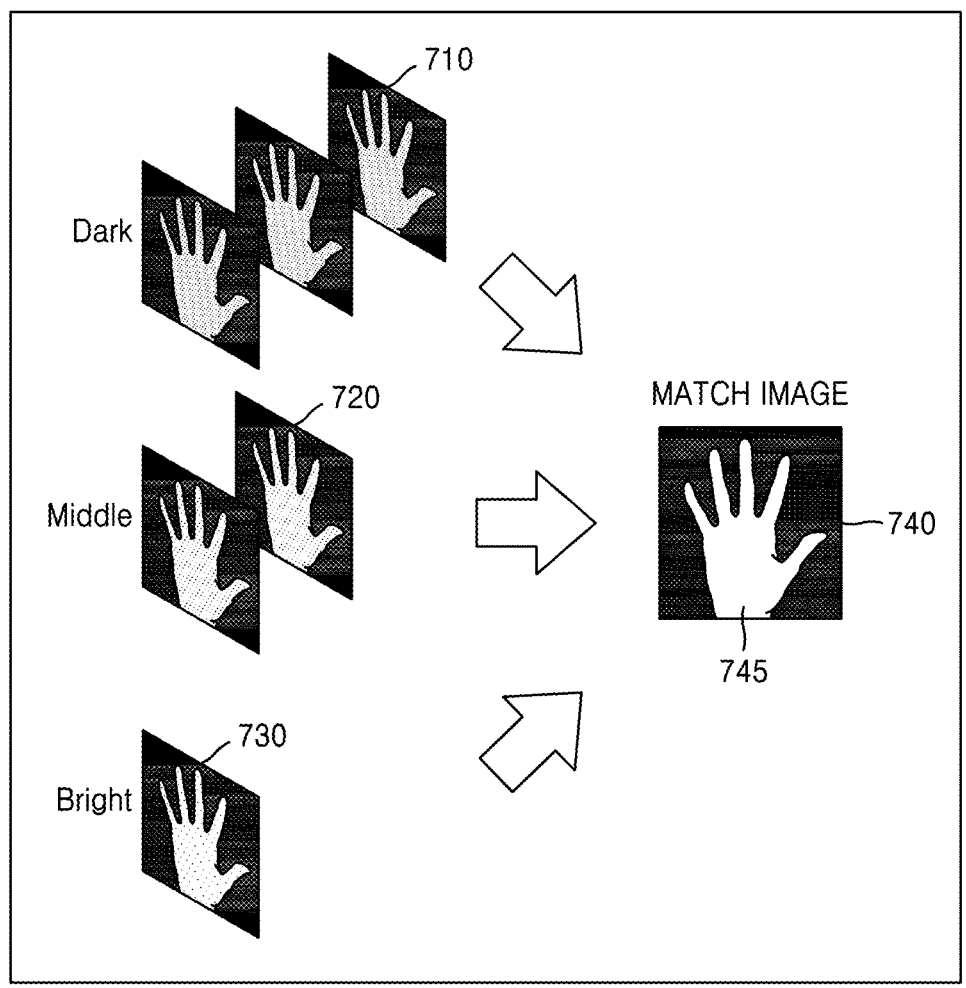
FIG. 7 illustrates a diagram for describing an operation in which a projecting device obtains a match image by using an object image captured according to illuminance, according to an embodiment of the disclosure.

FIG. 7 illustrates a diagram for describing an operation in which a projecting device obtains a match image by using an object image captured according to illuminance, according to an embodiment of the disclosure. For convenience of descriptions, elements overlapping with the descriptions of FIGS. 1 to 6 are briefly described or are not provided.

Referring to FIG. 7, in an embodiment of the disclosure, a projecting device may obtain object images including an object. The projecting device may obtain a match image 740 based on the object images.

According to an embodiment of the disclosure, the projecting device may obtain illuminance information indicating illuminance of an external projection surface on which an image light is projected via a projection lens. The projecting device may obtain the match image 740 by matching many object images when illuminance according to the illuminance information is dark.

For convenience, FIG. 7 will now be described with a case where illuminance according to the illuminance information is dark, a case where illuminance according to the illuminance information is middle, and a case where illuminance according to the illuminance information is bright. However, illuminance may indicate relative illuminance. Also, for convenience, illuminance is divided into three cases, but the disclosure is not limited thereto.

According to an embodiment of the disclosure, when illuminance according to the illuminance information is dark, the projecting device may obtain a 1_1 object image 710. When also referring to FIG. 6, the projecting device may obtain the 1_1 object images 610 and 710 by photographing an object during the photographing period according to the first camera signal. While the object is illustrated as a hand, this is merely an example, and the disclosure is not limited thereto.

According to an embodiment of the disclosure, the projecting device may recognize the object, based on an object image with reference illuminance requested for recognizing the object. That is, the projecting device may not recognize the object, based on an object image being lower than the reference illuminance. Illuminance of the 1_1 object image 710 may not satisfy the reference illuminance. The illuminance of the 1_1 object image 710 may be lower than the reference illuminance.

The projecting device may obtain the match image 740 by matching at least two 1_1 object images 710. When illuminance is dark, the projecting device may obtain the match image 740 by matching a plurality of 1_1 object images 710. For example, the projecting device may obtain the match image 740 by matching three 1_1 object images 710. However, the number of the 1_1 object images 710 for matching is merely an example, and the disclosure is not limited thereto.

According to an embodiment of the disclosure, when illuminance according to the illuminance information is middle, the projecting device may obtain a 2_1 object image 720. When also referring to FIG. 6, the projecting device may obtain the 2_1 object images 720 by photographing an object during the photographing period according to the second camera signal. While the object is illustrated as a hand, this is merely an example, and the disclosure is not limited thereto.

According to an embodiment of the disclosure, illuminance of the 2_1 object image 720 may not satisfy the reference illuminance. The illuminance of the 2_1 object image 720 may be lower than the reference illuminance.

The projecting device may obtain the match image 740 by matching at least two 2_1 object images 720. When illuminance is middle, the projecting device may obtain the match image 740 by matching a plurality of 2_1 object images 720. For example, the projecting device may obtain the match image 740 by matching two 2_1 object images 720.

The number of the 2_1 object images 720 for matching may be smaller than the number of the 1_1 object images 710 for matching. That is, as illuminance of the 2_1 object images 720 is greater than illuminance of the 1_1 object images 710, the projecting device may obtain the match image 740 by matching a relatively smaller number of 2_1 object images 720. However, the number of the 2_1 object images 720 for matching is merely an example, and the disclosure is not limited thereto.

According to an embodiment of the disclosure, when illuminance according to the illuminance information is bright, the projecting device may obtain a 3_1 object image 730. When also referring to FIG. 6, the projecting device may obtain the 3_1 object image 730 by photographing an object during the photographing period according to the third camera signal. While the object is illustrated as a hand, this is merely an example, and the disclosure is not limited thereto.

According to an embodiment of the disclosure, illuminance of the 3_1 object image 730 may satisfy the reference illuminance.

The projecting device may obtain the match image 740 via the 3_1 object image 730. The match image 740 may be the same as the 3_1 object image 730. When illuminance is bright, the projecting device may obtain the match image 740 via only one 3_1 object image 730.

That is, when illuminance of an object image is dark, the projecting device may obtain the match image 740 by matching a plurality of object images. However, when illuminance of an object image is appropriate, the projecting device may use the object image as the match image 740.

According to an embodiment of the disclosure, when the illuminance according to the illuminance information is very bright, the projecting device may obtain a 4_1 object image. The illuminance according to the illuminance information may exceed the reference illuminance.

The projecting device may obtain the match image 740 via the 4_1 object image. The projecting device may obtain the 4_1 object image during a preset photographing period. When the illuminance according to the illuminance information exceeds the reference illuminance, the projecting device may obtain the 4_1 object image satisfying the reference illuminance during a short photographing period. The projecting device may use the 4_1 object image as the match image 740.

That is, when the illuminance according to the illuminance information exceeds the reference illuminance, the projecting device may obtain the 4_1 object image by photographing an object during a short photographing period as the illuminance increases. The projecting device may use the obtained 4_1 object image as the match image 740.

Figure 8:
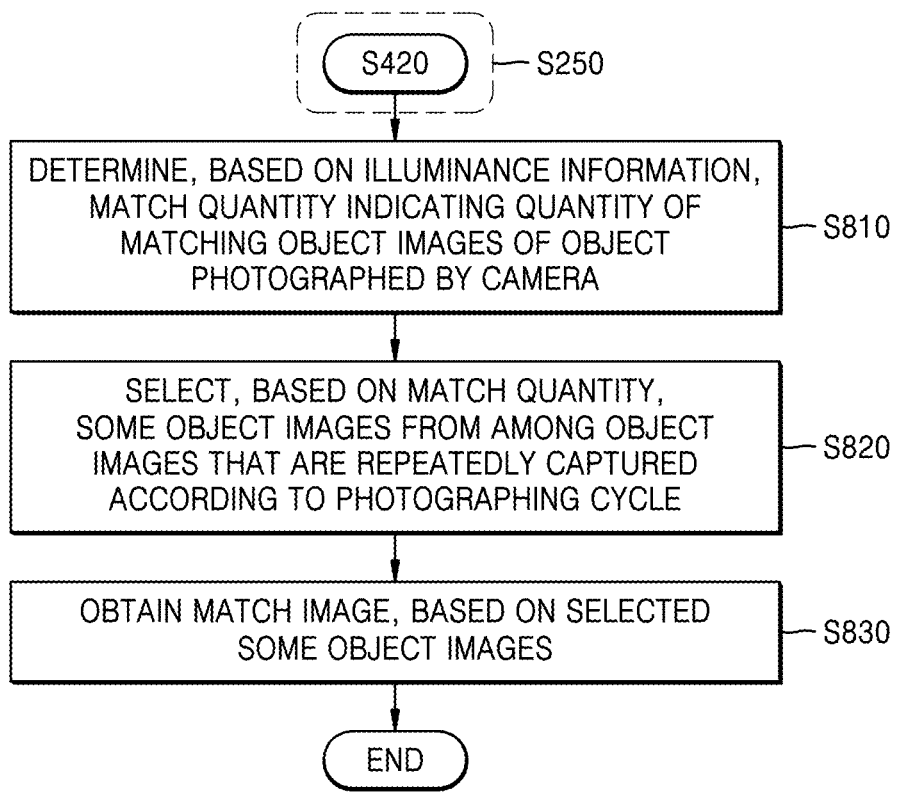
FIG. 8 illustrates a flowchart of an operating method by which a projecting device recognizes an object by matching captured images, according to an embodiment of the disclosure.

FIG. 8 illustrates a flowchart of an operating method by which a projecting device recognizes an object by matching captured images, according to an embodiment of the disclosure.

Referring to FIG. 8, in operation S810, the projecting device may determine a match quantity, based on illuminance information. The match quantity may indicate a quantity of matching object images of an object photographed by a camera.

According to an embodiment of the disclosure, when illuminance based on the illuminance information is dark, the projecting device may determine a high number for the match quantity. For example, when illuminance based on the illuminance information is dark, the projecting device may determine 4 as the match quantity.

According to an embodiment of the disclosure, when illuminance based on the illuminance information is middle, the projecting device may determine a moderate number for the match quantity. For example, when illuminance based on the illuminance information is middle, the projecting device may determine 3 as the match quantity. The match quantity of a case where illuminance based on the illuminance information is middle may be smaller than the match quantity of a case where illuminance based on the illuminance information is dark.

According to an embodiment of the disclosure, when illuminance based on the illuminance information is bright, the projecting device may determine a small number for the match quantity. For example, when illuminance based on the illuminance information is bright, the projecting device may determine 2 as the match quantity. The match quantity of a case where illuminance based on the illuminance information is bright may be smaller than the match quantity of a case where illuminance based on the illuminance information is middle.

In operation S820, the projecting device may select, based on the match quantity, some object images from among images that are repeatedly obtained according to a photographing cycle.

According to an embodiment of the disclosure, the projecting device may control the camera to repeatedly photograph an object during a photographing period, based on the photographing cycle (e.g., operation S420 of FIG. 4). The projecting device may obtain a plurality of object images by repeatedly photographing the object. The projecting device may select, based on the match quantity, some object images from among the plurality of object images.

For example, when illuminance based on the illuminance information is dark, the projecting device may determine 4 as the match quantity. The projecting device may select, based on the match quantity, four object images from among the plurality of object images.

As another example, when illuminance based on the illuminance information is middle, the projecting device may determine 3 as the match quantity. The projecting device may select, based on the match quantity, three object images from among the plurality of object images.

As another example, when illuminance based on the illuminance information is bright, the projecting device may determine 2 as the match quantity. The projecting device may select, based on the match quantity, two object images from among the plurality of object images.

In operation S830, the projecting device may obtain a match image, based on the selected some object images.

According to an embodiment of the disclosure, the projecting device may obtain the match image by matching images selected from among the plurality of object images. For example, when illuminance based on the illuminance information is dark, the projecting device may obtain a match image by matching the four object images selected from among the plurality of object images.

As another example, when illuminance based on the illuminance information is middle, the projecting device may obtain a match image by matching the three object images selected from among the plurality of object images. As another example, when illuminance based on the illuminance information is bright, the projecting device may obtain a match image by matching the two object images selected from among the plurality of object images.

Figure 9:
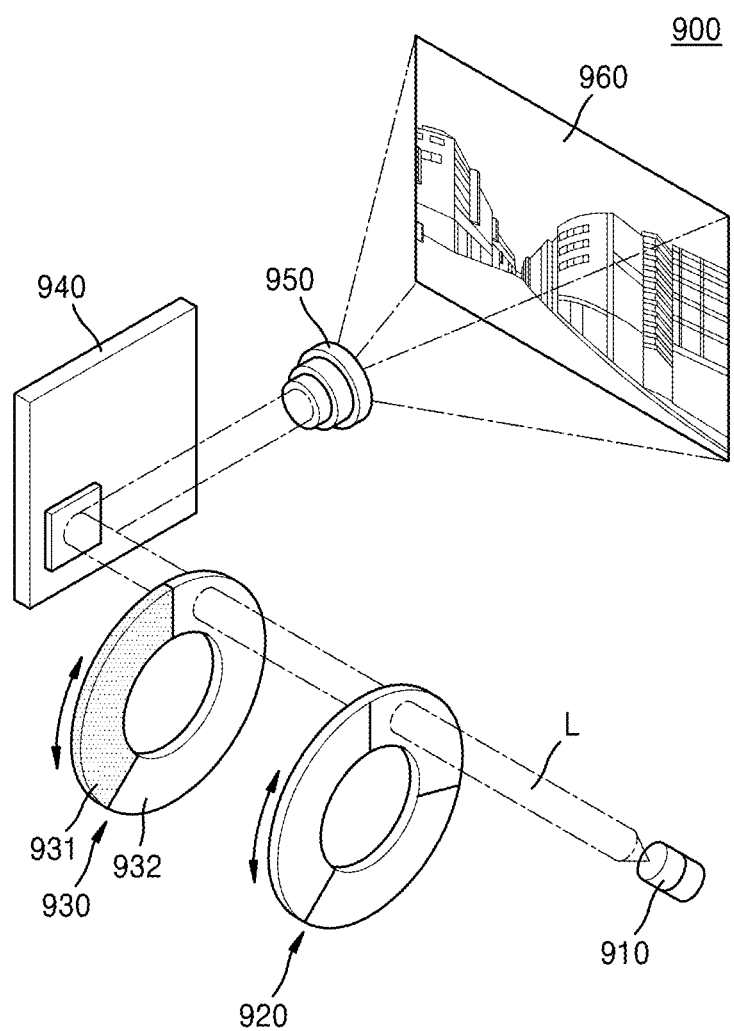
FIG. 9 illustrates a diagram for describing in detail a projector from among elements of a projecting device according to an embodiment of the disclosure.

FIG. 9 illustrates a diagram for describing in detail a projector from among elements of a projecting device according to an embodiment of the disclosure. In addition, FIG. 9 will now be described based on a configuration of a digital light processing (DLP)-based project, but this is merely an example, and the disclosure is not limited thereto. According to an embodiment of the disclosure, a blocking period in which an image is not projected by a light blocker 930 of FIG. 9 is configurable may be provided, but other elements are not particularly limited.

Referring to FIG. 9, the projecting device may include a projector 900 and a camera.

According to an embodiment of the disclosure, the projector 900 may include a light source unit (or light source) 910, a light separator 920, the light blocker 930, a mirror unit 940, and a projection lens 950. The projector 900 may project an image 960 on an external projection surface by using the light source unit 910, the light separator 920, the light blocker 930, the mirror unit 940, and the projection lens 950. However, the projector 900 is not limited to the example of FIG. 9, and more elements than the elements shown in FIG. 9 may be included in the projector 900 or fewer elements than the elements shown in FIG. 9 may be included in the projector 900.

According to an embodiment of the disclosure, the projector 900 is configured to externally project an image. Projection according to an embodiment of the disclosure may be implemented in various types (e.g., a cathode-ray tube (CRT) type, a liquid crystal display (LCD) type, a DLP type, a laser type, etc.). For example, the CRT type has basically the same principle as a CRT monitor. The CRT type displays an image on a screen by enlarging an image via a lens in front of a CRT. The CRT type is divided into a single-CRT type and a three-CRT type, according to the number of CRTs, and in the three-CRT type, CRTs for Red, Green, and Blue are separately implemented.

As another example, the LCD type displays an image by transmitting light from a light source to liquid crystal. The LCD type is divided into a single-panel type and a three-panel type, and in the three-panel type, light from a light source may be separated into Red, Green, Blue via a dichroic mirror (e.g., a mirror that reflects light with a particular color and allows others to pass through), may pass through liquid crystals, and then may be collected.

As another example, the DLP type is a type of displaying an image by using a digital micromirror device (DMD) chip. A projection unit of the DLP type may include a light source, a color wheel, a DMD chip, a projection lens, or the like. Light output from the light source may have color by passing through the color wheel. The light passed through the color wheel is input to the DMD chip. The DMD chip includes many micro-mirrors, and reflects the light input to the DMD chip. The projection lens may be configured to enlarge the light reflected from the DMD chip to an image size.

As another example, the laser type includes a diode-pumped solid state (DPSS) laser and a galvanometer. As a laser for outputting various colors, a laser in which three DPSS lasers are provided for respective RGB colors and optical axes overlap by using a special mirror is used. The galvanometer includes a mirror and a high-output motor so as to move a mirror at a fast speed. For example, the galvanometer may rotate the mirror maximally at 40 KHz. The galvanometer is mounted in a scan direction, and as a projector performs flat scanning, the galvanometer may be provided at the X axis and the Y axis.

According to an embodiment of the disclosure, the light source unit 910 may output an image light L. The light source unit 910 may output the image light L to be emitted to respective particular areas of the light separator 920 and the light blocker 930.

According to an embodiment of the disclosure, the light separator 920 may convert the output image light L into red (R), blue (B), and green (G) by transmitting the output image light L. In particular, as illustrated, the light separator 920 may include color filters for allowing respective red, blue, and green beams to selectively pass through. The light separator 920 may include a rotation plate on which the respective color filters are rotatably mounted, and a driving motor for rotatably driving the rotation plate.

According to an embodiment of the disclosure, the light separator 920 may be controlled so that, as the rotation plate is rotated by the driving motor, red, blue, and green color filters are sequentially arranged on a light path on which the image light L travels. Accordingly, the projecting device may separate the image light L output from the light source unit 910 into red, blue, and green image lights.

According to an embodiment of the disclosure, the light separator 920 may indicate a DLP-type color wheel.

According to an embodiment of the disclosure, the light blocker 930 may block a separate image light. In detail, the light blocker 930 may include a light-blocking filter 931 and a light-transmitting filter 932. The light blocker 930 may include a rotation plate on which the light-blocking filter 931 and the light-transmitting filter 932 are rotatably mounted, and a driving motor for rotatably driving the rotation plate.

According to an embodiment of the disclosure, the light blocker 930 may be controlled so that, as the rotation plate is rotated by the driving motor, the light-blocking filter 931 and the light-transmitting filter 932 are alternately arranged on a light path on which the image light L travels. Accordingly, the projecting device may block an image light output from the light source unit 910 during a blocking period. Also, the projecting device may transmit an image light output from the light source unit 910 during a projection period.

According to an embodiment of the disclosure, the mirror unit 940 may reflect the image light L transmitted by the light blocker 930. The mirror unit 940 may be an optical semiconductor consisting of a plurality of micromirrors. For example, the mirror unit 940 may indicate a DLP-type DMD chip.

According to an embodiment of the disclosure, the mirror unit 940 may reflect the image light L transmitted by the light separator 920 and the light blocker 930, based on color (RGB) information consisting of an image. The mirror unit 940 may reflect the image light L to correspond to the image, based on the color information consisting of the image.

According to an embodiment of the disclosure, the projection lens 950 may enlarge the image light L reflected from the mirror unit 940. The projecting device may project the image 960 by projecting the enlarged image light on an external projection surface.

Figure 10:
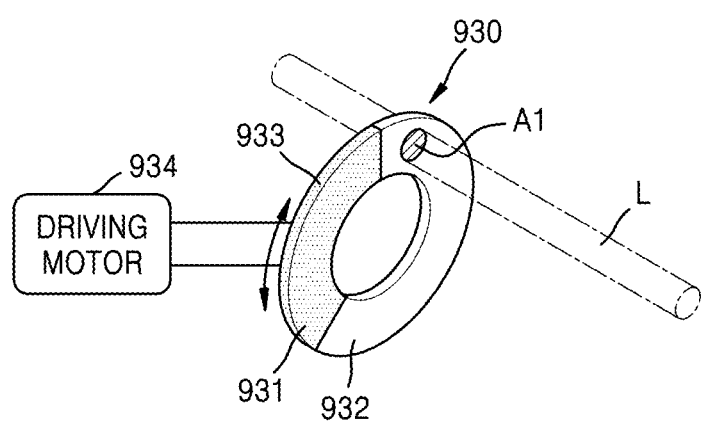
FIG. 10 illustrates a diagram for describing in detail a light blocker from among elements of a projecting device according to an embodiment of the disclosure.

FIG. 10 illustrates a diagram for describing in detail a light blocker from among elements of a projecting device according to an embodiment of the disclosure.

Referring to FIG. 10, the light blocker 930 may include the light-blocking filter 931, the light-transmitting filter 932, a rotation plate 933, and a driving motor 934.

According to an embodiment of the disclosure, the light-blocking filter 931 may block an image light L output from the light source unit 910. The light-transmitting filter 932 may transmit the image light L output from the light source unit 910.

The light-transmitting filter 932 and the light-blocking filter 931 may be connected with each other. As illustrated, the light-transmitting filter 932 and the light-blocking filter 931 may be mounted on the rotation plate 933. The rotation plate 933 may be rotated by the driving motor 934. As the rotation plate 933 rotates, the light-transmitting filter 932 and the light-blocking filter 931 may be alternately arranged on a light path on which the image light L travels.

The driving motor 934 may rotatably drive the rotation plate 933. For example, the driving motor 934 may provide power to allow the rotation plate 933 to make one rotation in a constant direction. The driving motor 934 may provide, based on a preset signal, power to allow the rotation plate 933 to make one rotation in a constant direction. When the preset signal is repeated, the driving motor 934 may provide power to allow the rotation plate 933 to repeatedly perform an operation of making one rotation.

According to an embodiment of the disclosure, the driving motor 934 may provide power to allow the rotation plate 933 to rotate. As the rotation plate 933 rotates, the light-transmitting filter 932 and the light-blocking filter 931 may be alternately arranged on a light path on which the image light L travels.

Referring to FIG. 10, as the rotation plate 933 rotates, the light-transmitting filter 932 may be arranged on a light path. As the rotation plate 933 rotates, the image light L on a light path may be transmitted via a first area A1 on the light-transmitting filter 932. The light-transmitting filter 932 may transmit the image light L that travels along the light path. The transmitted image light L may be externally projected via the projection lens 950 (see, e.g., FIG. 9). That is, the projecting device may project an image.

Figure 11:
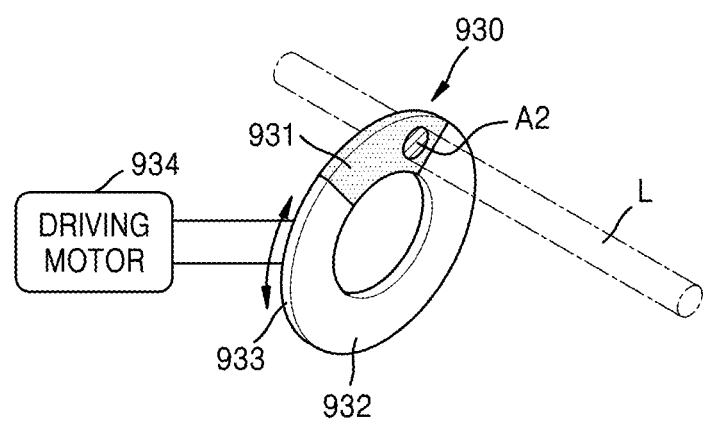
FIG. 11 illustrates a diagram for describing in detail a light blocker from among elements of a projecting device according to an embodiment of the disclosure.

FIG. 11 illustrates a diagram for describing in detail a light blocker from among elements of a projecting device according to an embodiment of the disclosure. For convenience of descriptions, what are overlapping with the descriptions of FIG. 10 are not provided.

Referring to FIG. 11, as the rotation plate 933 rotates, the light-blocking filter 931 may be provide on a light path. As the rotation plate 933 rotates, an image light L on the light path may be blocked due to a second area A2 of the light-blocking filter 931. The light-blocking filter 931 may block the image light L that travels along the light path. As the image light L is blocked, the image light L may be projected to the outside via the projection lens 950. That is, a blocking period may start.

According to an embodiment of the disclosure, as the image light L is blocked by the light-blocking filter 931, the projecting device may not project an image. That the image light L is blocked by the light-blocking filter 931 may indicate the blocking period. That is, the projecting device may not project an image during the blocking period. The projecting device may obtain an object image by photographing an object positioned on an external projection surface, by using a camera during a photographing period included in the blocking period.

According to an embodiment of the disclosure, the projecting device may detect the object included in the object image, based on the object image. According to an embodiment of the disclosure, the projecting device may obtain a match image, based on the object image. The projecting device may detect the object included in the match image, based on the match image.

Figure 12:
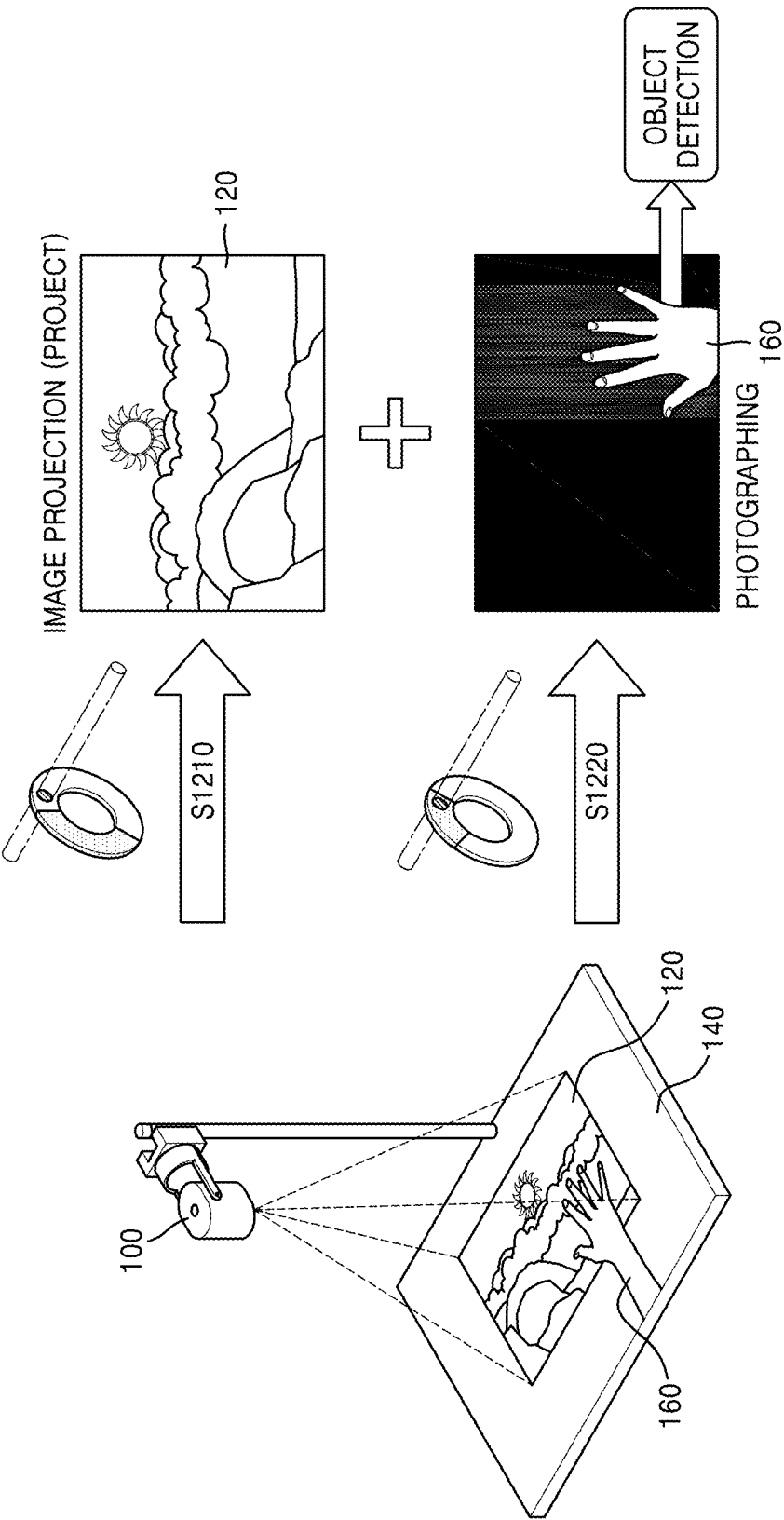
FIG. 12 illustrates a conceptual diagram for describing a feature by which an operation of a projecting device is determined based on an operation of a light blocker, according to an embodiment of the disclosure.

FIG. 12 illustrates a conceptual diagram for describing a feature by which an operation of a projecting device is determined based on an operation of a light blocker, according to an embodiment of the disclosure. For convenience of descriptions, what are overlapping with the descriptions of FIGS. 1, 10, and 11 are briefly described or are not provided.

Referring to FIG. 12, according to an embodiment of the disclosure, the projecting device 100 may separately perform an operation (S1210) of projecting an image by a light blocker and an operation (S1220) of photographing an object. For convenience of descriptions, what are overlapping with the descriptions of FIGS. 1, 10, and 11 are briefly described or are not provided.

In operation S1210, the projecting device 100 may project an image. An operation of the light blocker which corresponds to operation S1210 may be the same as an operation described with reference to FIG. 10. As the rotation plate 933 of the light blocker 930 rotates, the light-transmitting filter 932 may be provided on a light path on which an image light L travels. The image light L may be transmitted by the light-transmitting filter 932. The transmitted image light L may be externally projected via the projection lens 950. That is, the projecting device 100 may project an image 120.

According to an embodiment of the disclosure, a period in which the image light L is transmitted by the light-transmitting filter 932 may indicate a projection period. The projecting device 100 may project the image 120 during the projection period.

In operation S1220, the projecting device 100 may photograph an object. An operation of the light blocker 930 which corresponds to operation S1220 may be the same as an operation described with reference to FIG. 11. As the rotation plate 933 of the light blocker 930 rotates, the light-blocking filter 931 may be provided on a light path on which an image light L travels. The image light L may be blocked by the light-blocking filter 931. That is, the projecting device 100 may not project the image 120.

According to an embodiment of the disclosure, the projecting device 100 may photograph an object 160 while the image light L is blocked. The projecting device 100 may obtain an object image including the object 160. The projecting device 100 may detect the object 160 included in the object image, based on the object image.

According to an embodiment of the disclosure, a period in which the image light L is blocked by the light-blocking filter 931 may indicate a blocking period. The projecting device 100 may set a photographing period to be included in the blocking period. The projecting device 100 may control the camera to photograph the object 160 during the photographing period.

According to an embodiment of the disclosure, the projecting device 100 may receive a preset clock signal so as to control the light blocker 930 to rotate. The projecting device 100 may receive a repetitive clock signal so as to control the light blocker 930 to repeatedly rotate, based on the signal.

The projecting device may control the light blocker 930 to alternately repeat the operation of S1210 and the operation of S1220.

As the operation of S1220 is repeatedly performed, the projecting device 100 may obtain a plurality of object images including the object 160. The projecting device 100 may obtain a match image by matching the plurality of object images. The projecting device 100 may detect the object 160 included in the match image, based on the match image.

Figure 13:
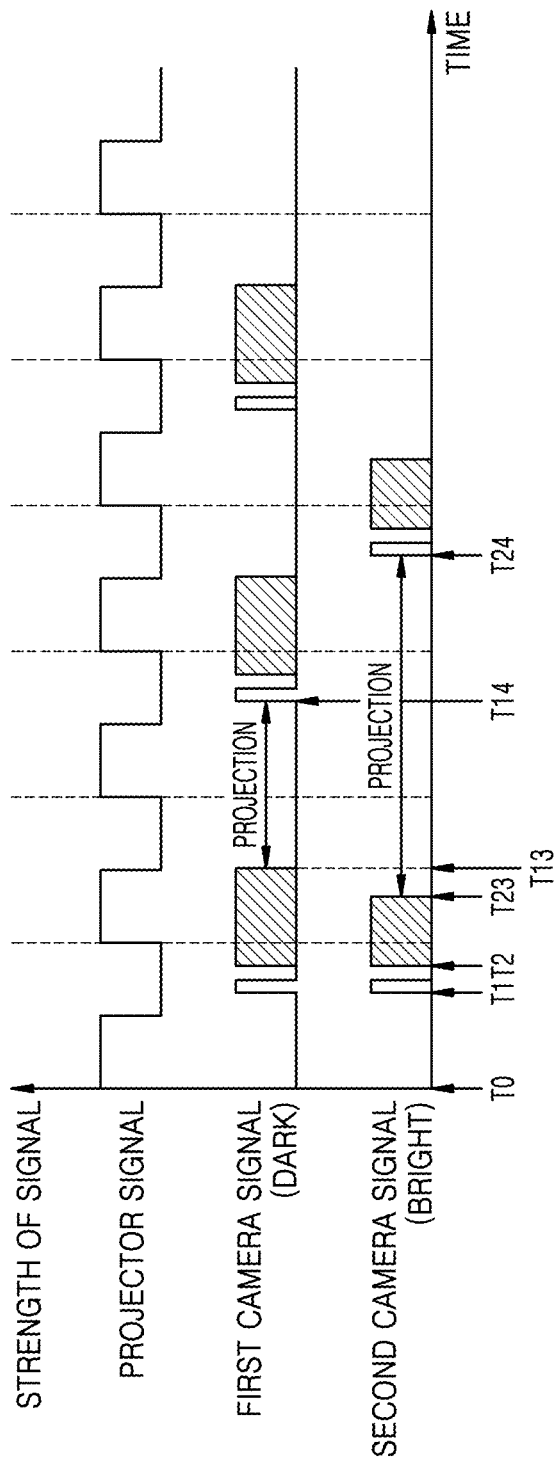
FIG. 13 illustrates a graph showing operations in which a projecting device photographs an object by using different photographing cycles according to illuminance, according to an embodiment of the disclosure.

FIG. 13 illustrates a graph showing operations in which a projecting device photographs an object by using different photographing cycles according to illuminance, according to an embodiment of the disclosure. For convenience of descriptions, elements overlapping with the descriptions of FIGS. 3 and 6 are briefly described or are not provided.

Referring to FIG. 13, a projecting device may obtain a projector signal and a plurality of camera signals. The projector signal and the plurality of camera signals received by the projecting device may not be synchronized.

According to an embodiment of the disclosure, the projector signal may start at an initial time point T0 and 0 and 1 may be repeated at regular intervals. On the contrary, a first camera signal and a second camera signal may not start at the initial time point T0. For example, as illustrated, the first camera signal and the second camera signal may start at a first time point T1 and 0 and 1 may be repeated at regular intervals.

Referring to FIG. 6, according to an embodiment of the disclosure, the projector signal and the plurality of camera signals may simultaneously start at the first time point T1 and may be repeated at regular intervals. That is, the projector signal and the plurality of camera signals may be synchronized.

On the contrary, as illustrated in FIG. 13, the projector signal and the plurality of camera signals received by the projecting device may not be synchronized with each other.

According to an embodiment of the disclosure, when illuminance is dark, the projecting device may obtain the first camera signal. When illuminance is bright, the projecting device may obtain the second camera signal.

According to an embodiment of the disclosure, the projecting device may photograph an object after a lapse of a preset time from a time point T1 when the camera signal is obtained. Here, the camera signal may include the first camera signal and the second camera signal. The preset time may refer to a time from the first time point T1 to a second time point T2.

According to an embodiment of the disclosure, the projecting device may set a blocking period in which an image light output by a light source unit is blocked. The projecting device may set the blocking period to be repeated according to a preset interval. As illustrated, when illuminance is dark, the blocking period may include a time from the second time point T2 to a 1_3 time point T13. When illuminance is bright, the blocking period may include a time from the second time point T2 to a 2_3 time point T23.

According to an embodiment of the disclosure, the projecting device may set a photographing period in which an object is photographed using a camera. The photographing period may be included in the blocking period.

For example, when illuminance is dark, the projecting device may photograph an object, based on the first camera signal. When illuminance is dark, the photographing period may include a time from the second time point T2 to the 1_3 time point T13.

When illuminance is bright, the projecting device may photograph the object, based on the second camera signal. When illuminance is bright, the photographing period may include a time from the second time point T2 to the 2_3 time point T23.

According to an embodiment of the disclosure, the projecting device may determine a length of a projection period according to illuminance. The projecting device may determine the length of the projection period, based on illuminance information indicating illuminance of an external projection surface on which an image is projected. The projecting device may set the length of the projection period to decrease as illuminance decreases.

For example, when illuminance is dark, the projecting device may photograph an object, based on the first camera signal. When illuminance is dark, the projection period may include a time from the 1_3 time point T13 to a 1_4 time point T14.

When illuminance is bright, the projecting device may photograph the object, based on the second camera signal. When illuminance is bright, the projection period may include a time from the 2_3 time point T23 to a 2_4 time point T24.

Figure 14:
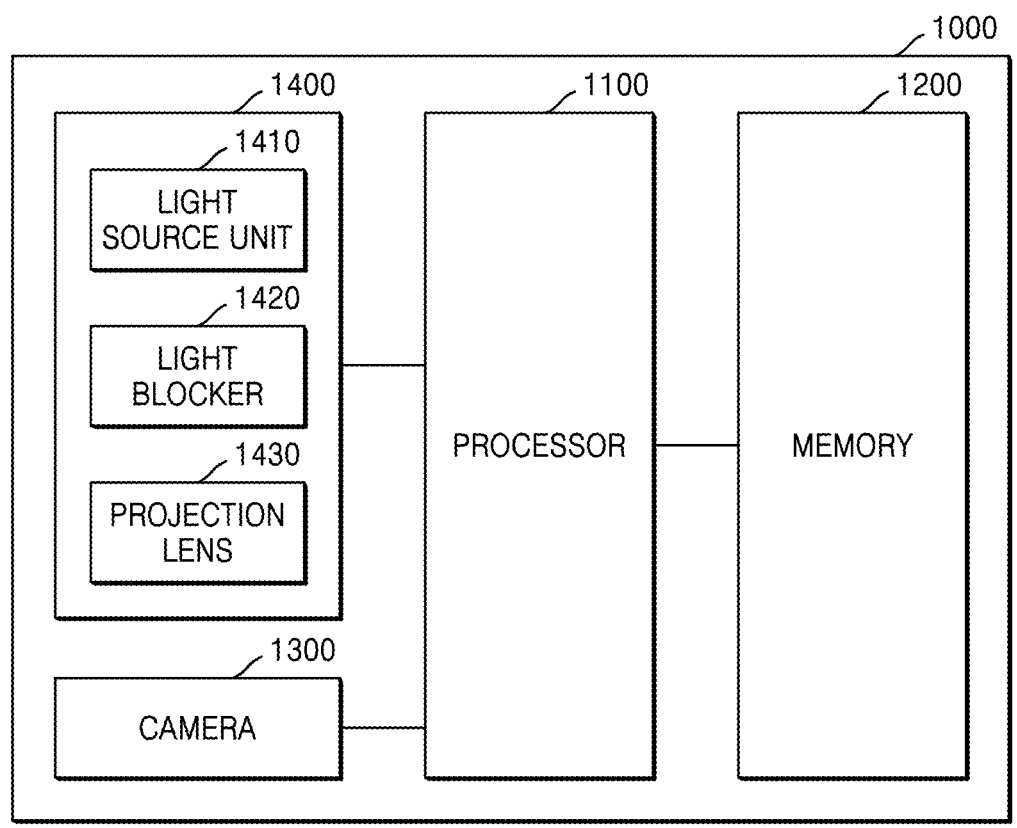
FIG. 14 illustrates a block diagram for describing a configuration of a projecting device according to an embodiment of the disclosure.

FIG. 14 illustrates a block diagram for describing a configuration of a projecting device according to an embodiment of the disclosure.

Referring to FIG. 14, a projecting device 1000 may include a processor 1100, a memory 1200, a camera 1300, and a projector 1400. The projector 1400 may include a light source unit 1410, a light blocker 1420, and a projection lens 1430. The processor 1100, the memory 1200, the camera 1300, and the projector 1400 may be electrically and/or physically connected to each other.

However, elements shown in FIG. 14 are only based on an embodiment of the disclosure, and thus, elements included in the projecting device 1000 are not limited to what are shown in FIG. 14. The projecting device 1000 may not include some of the elements shown in FIG. 14, or may further include elements not shown in FIG. 14. For example, the projecting device 1000 may further include a power supplier (e.g., a battery) for supplying driving power to the camera 1300, the projector 1400, the processor 1100, and the memory 1200.

The light source unit 1410 may output an image light. The image light may include a white light.

The light blocker 1420 may block the image light output from the light source unit 1410. The light blocker 1420 may block the image light during a preset period, and may project an image light during a different preset period.

According to an embodiment of the disclosure, the light blocker 1420 may include a blocking filter for blocking an image light, a projection filter for projecting an image light, and a driving motor for rotating the blocking filter and the projection filter to be alternately provided. The light blocker 1420 may be provided as a rotatable wheel. As the light blocker 1420 rotates by the driving motor, an image light incident on the light blocker 1420 may be blocked by the blocking filter or may be projected by the projection filter.

An image light projected by the light blocker 1420 may be externally projected via the projection lens 1430. That is, the processor 1100 may project an image by externally projecting an image light by using the projection lens 1430.

The camera 1300 may photograph an object positioned on an external projection surface. The processor 1100 may obtain an object image of the object by using the camera 1300.

According to an embodiment of the disclosure, the processor 1100 may set a blocking period in which an image light is blocked by the light blocker 1420. The processor 1100 may set a photographing period to be included in the blocking period. The processor 1100 may obtain, during the photographing period, an object image by using the camera 1300.

The processor 1100 may execute one or more instructions or program code stored in the memory 1200, and may perform a function and/or operation corresponding to the instructions or the program code. The processor 1100 may include hardware elements for performing arithmetic, logic, and input/output computations and signal processing. The processor 1100 may include, for example, at least one of a CPU, a microprocessor, a graphic processor (graphics processing unit (GPU)), an AP, application specific integrated circuits (ASICs), digital signal processors (DSPs), digital signal processing devices (DSPDs), programmable logic devices (PLDs), or field programmable gate arrays (FPGAs), but the disclosure is not limited thereto.

While the processor 1100 is illustrated as one element in FIG. 14, the disclosure is not limited thereto. In an embodiment of the disclosure, the processor 1100 may include one or more processors.

In an embodiment of the disclosure, the processor 1100 may be configured as a dedicated hardware chip for performing AI learning.

The memory 1200 may store instructions and program code which are readable by the processor 1100. The memory 1200 may include at least one of a flash memory type, a hard disk type, a multimedia card micro type, a memory card type (e.g., a secure digital (SD) or extreme digital (XD) memory card), random access memory (RAM) (static random access memory (SRAM), read-only memory (ROM), electrically erasable programmable read-only memory (EEPROM), programmable read-only memory (PROM), mask ROM, flash ROM, etc.), a hard disk drive (HDD), or a solid state drive (SSD).

The memory 1200 may store instructions or program code for performing a function or operations of the projecting device 1000. According to an embodiment of the disclosure, the memory 1200 may store instructions, algorithm, data structure, program code, or application program, which is readable by the processor 1100. The instructions, the algorithm, the data structure, and the program code stored in the memory 1200 may be implemented in, for example, programming or scripting languages such as C, C++, Java, assembler, etc.

The memory 1200 may store instructions, algorithm, data structure, or program code for a model for setting a blocking period for blocking an image light and controlling a camera to photograph an object during a photographing period included in the blocking period. The 'modules' included in the memory 1200 refer to units for processing a function or operation performed by the processor 1100, which may be implemented in software such as instructions, algorithm, data structure, or program code.

In the embodiment below, the processor 1100 may be implemented by executing instructions or program codes stored in the memory 1200.

According to an embodiment of the disclosure, a projecting device for recognizing an object with image projection may include a light source unit, a projection lens, a camera, a light blocker, and at least one processor. The light source unit may be configured to output an image light. The output image light may be externally projected via the projection lens. The camera may be configured to photograph an object positioned between the camera and an external projection surface of the image light that is projected. The light blocker may be configured to block the image light output by the light source during a blocking period.

According to an embodiment of the disclosure, the processor 1100 may obtain illuminance information regarding illuminance of an external projection surface. The processor 1100 may set the blocking period during which the image light output by the light source is blocked, based on the illuminance information. The processor 1100 may set the photographing period within the blocking period. The processor 1100 may control the light blocker 1420 to block an image light output by the light source during the blocking period. The processor 1100 may control the camera 1300 to photograph an object during the photographing period.

In an embodiment of the disclosure, a start point of the photographing period may match a start point of the blocking period.

In an embodiment of the disclosure, the photographing period may include a first photographing period and a second photographing period following the first photographing period. The at least one processor may be further configured to determine a photographing cycle from a start of the first photographing period to a start of the second photographing period, The at least one processor may be further configured to control the camera to repeatedly photograph the object during the photographing period, based on the photographing cycle.

In an embodiment of the disclosure, photographing period and a projection period not overlapping the photographing period are repeated during the photographing cycle. The photographing period may be shorter than the projection period.

In an embodiment of the disclosure, the at least one processor may be further configured to set the projection period and the photographing period so that a rate of the photographing period with respect to the projection period decreases as illuminance according to the illuminance information increases.

In an embodiment of the disclosure, the at least one processor may be further configured to set the photographing period to decrease as the illuminance according to the illuminance information increases, based on the illuminance information.

In an embodiment of the disclosure, the at least one processor may be further configured to obtain a first object image of the object, by controlling the camera to photograph the object during the first photographing period. The at least one processor may be further configured to obtain a second object image of the object, by controlling the camera to photograph the object during the second photographing period. The at least one processor may be further configured to obtain a match image based on the first object image and the second object image.

In an embodiment of the disclosure, illuminance of the match image may be greater than illuminance of the first object image and illuminance of the second object image.

In an embodiment of the disclosure, the at least one processor may be further configured to determine, based on the illuminance information, a match quantity indicating a quantity of matching object images of the object photographed by the camera. The at least one processor may be further configured select, based on the match quantity, object images from among a plurality of object images that are repeatedly captured according to the photographing cycle. The at least one processor may be further configured to obtain a match image, based on the selected object images.

The match quantity may decrease as the illuminance according to the illuminance information increases.

In an embodiment of the disclosure, the light blocker may include a light-transmitting filter configured to transmit the image light output by the light source. The light blocker may include a light-blocking filter connected to the light-transmitting filter and configured to block the image light output by the light source. The light blocker may include a rotation plate on which the light-transmitting filter and light-blocking filter are rotatably mounted. The light blocker may include a driving motor configured to rotatably drive the rotation plate to cause the light-transmitting filter and the light-blocking filter to be alternately arranged on a light path on which the image light travels.

In an embodiment of the disclosure, the image light is blocked by the light-blocking filter as the light blocker rotates during the blocking period. The image light is transmitted by the light-transmitting filter as the light blocker rotates during a projection period.

According to an embodiment of the disclosure, a method of recognizing an object with image projection may include obtaining illuminance information regarding illuminance of an external projection surface of an image light projected via a projection lens. The method may include setting a blocking period during which an image light output by a light source unit is blocked, based on the illuminance information. The method may include setting a photographing period within the blocking period. The method may include blocking the output image light during the blocking period. The method may include photographing, by using a camera, the object positioned on the external projection surface during the photographing period.

In an embodiment of the disclosure, the photographing period may include a first photographing period and a second photographing period following the first photographing period. The setting of the photographing period may include determining a photographing cycle from a start of the first photographing period to a start of the second photographing period. The photographing of the object may include repeatedly photographing the object during the photographing period, based on the photographing cycle.

In an embodiment of the disclosure, the photographing cycle may be a cycle in which the photographing period and a projection period not overlapping the photographing period are repeated. The photographing period may be shorter than the projection period.

In an embodiment of the disclosure, the setting of the photographing period may include setting the photographing period and the projection period so that a rate of the photographing period with respect to the projection period decreases as illuminance according to the illuminance information increases.

In an embodiment of the disclosure, the setting of the photographing period may include setting the photographing period to decrease as illuminance according to the illuminance information increases, based on the illuminance information.

In an embodiment of the disclosure, the repeatedly photographing of the object may include obtaining a first object image of the object, by photographing the object during the first photographing period. The repeatedly photographing of the object may include obtaining a second object image of the object, by photographing the object during the second photographing period. The method further include obtaining a match image based on the first object image and the second object image.

In an embodiment of the disclosure, illuminance of the match image may be greater than illuminance of the first object image and illuminance of the second object image.

In an embodiment of the disclosure, the method may further include determining, based on the illuminance information, a match quantity indicating a quantity of matching object images of the photographed object. The method may further include selecting, based on the match quantity, object images from among a plurality of object images that are repeatedly captured according to the photographing cycle. The method may further include obtaining a match image, based on the selected object images. The match quantity may decrease as the illuminance according to the illuminance information increases.

According to an embodiment of the disclosure, provided is a computer-readable recording medium having recorded thereon a program for performing the method, on a computer.

A machine-readable storage medium may be provided in the form of a non-transitory storage medium. In this regard, the term "non-transitory storage medium" merely means that the storage medium is a tangible device, and does not include a signal (e.g., an electromagnetic wave), and this term does not differentiate between a case where data is semi-permanently stored in the storage medium and a case where the data is temporarily stored in the storage medium. For example, the non-transitory storage medium may include a buffer in which data is temporarily stored.

According to an embodiment of the disclosure, the method according to various embodiments disclosed in the present specification may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store, or between two user devices (e.g., smartphones) directly. For online distribution, at least a part of the computer program product (e.g., a downloadable app) may be temporarily generated or be at least temporarily stored in a machine-readable storage medium, e.g., a server of a manufacturer, a server of an application store, or a memory of a relay server.

What is claimed is:

1. A projecting device configured to recognize an object with image projection, the projecting device comprising:
   a light source configured to output an image light;
   a projection lens configured to externally project the image light;
   a camera configured to photograph an object positioned between the camera and an external projection surface of the image light that is projected;
   a light blocker configured to block the image light output by the light source during a blocking period; and
   at least one processor configured to control operations of the light source, the camera, and the light blocker,
   wherein the at least one processor is further configured to:
      obtain illuminance information regarding illuminance of the external projection surface,
      set the blocking period during which the image light output by the light source is blocked, based on the illuminance information,
      set a photographing period within the blocking period,
      control the light blocker to block the image light output by the light source during the blocking period, and
      control the camera to photograph the object during the photographing period.

2. The projecting device of claim 1, wherein a start point of the photographing period matches a start point of the blocking period.

3. The projecting device of claim 1, wherein the photographing period comprises a first photographing period and a second photographing period following the first photographing period, and
   wherein the at least one processor is further configured to:
      determine a photographing cycle from a start of the first photographing period to a start of the second photographing period, and
      control the camera to repeatedly photograph the object during the photographing period, based on the photographing cycle.

4. The projecting device of claim 3, wherein the photographing period and a projection period not overlapping the photographing period are repeated during the photographing cycle, and
   wherein the photographing period is shorter than the projection period.

5. The projecting device of claim 4, wherein the at least one processor is further configured to set the blocking period so that a rate of the photographing period with respect to the projection period decreases as the illuminance according to the illuminance information increases.

6. The projecting device of claim 3, wherein the at least one processor is further configured to:
   obtain a first object image of the object, by controlling the camera to photograph the object during the first photographing period,
   obtain a second object image of the object, by controlling the camera to photograph the object during the second photographing period, and
   obtain a match image based on the first object image and the second object image.

7. The projecting device of claim 6, wherein illuminance of the match image is greater than illuminance of the first object image and illuminance of the second object image.

8. The projecting device of claim 3, wherein the at least one processor is further configured to:
   determine, based on the illuminance information, a match quantity indicating a quantity of matching object images of the object photographed by the camera,
   select, based on the match quantity, object images from among a plurality of object images that are repeatedly captured according to the photographing cycle, and
   obtain a match image, based on the selected object images,
   wherein the match quantity decreases as the illuminance according to the illuminance information increases.

9. The projecting device of claim 1, wherein the at least one processor is further configured to set the photographing period to decrease as the illuminance according to the illuminance information increases, based on the illuminance information.

10. The projecting device of claim 1, wherein the light blocker comprises:
    a light-transmitting filter configured to transmit the image light output by the light source;
    a light-blocking filter connected to the light-transmitting filter and configured to block the image light output by the light source;
    a rotation plate on which the light-transmitting filter and the light-blocking filter are rotatably mounted; and
    a driving motor configured to rotatably drive the rotation plate to cause the light-transmitting filter and the light-blocking filter to be alternately arranged on a light path on which the image light travels.

11. The projecting device of claim 10, wherein the image light is blocked by the light-blocking filter as the light blocker rotates during the blocking period, and wherein the image light is transmitted by the light-transmitting filter as the light blocker rotates during a projection period.

12. A method of recognizing an object with image projection, the method comprising:

obtaining illuminance information regarding illuminance of an external projection surface of a projected image light;

setting a blocking period during which an output image light is blocked, based on the illuminance information;

setting a photographing period within the blocking period;

blocking the output image light during the blocking period; and photographing the object positioned on the external projection surface during the photographing period.

13. The method of claim 12, wherein the photographing period comprises a first photographing period and a second photographing period following the first photographing period, wherein the setting the photographing period comprises determining a photographing cycle from a start of the first photographing period to a start of the second photographing period, and wherein the photographing the object comprises repeatedly photographing the object during the photographing period, based on the photographing cycle.

14. The method of claim 13, wherein the photographing period and a projection period not overlapping the photographing period are repeated during the photographing cycle, and wherein the photographing period is shorter than the projection period.

15. The method of claim 14, wherein the setting the blocking period comprises setting the blocking period so that a rate of the photographing period with respect to the projection period decreases as the illuminance according to the illuminance information increases.

16. The method of claim 13, wherein the repeatedly photographing the object comprises:

obtaining a first object image of the object, by photographing the object during the first photographing period; and obtaining a second object image of the object, by photographing the object during the second photographing period, and wherein the method further comprises obtaining a match image based on the first object image and the second object image.

17. The method of claim 16, wherein illuminance of the match image is greater than illuminance of the first object image and illuminance of the second object image.

18. The method of claim 13, further comprising:

determining, based on the illuminance information, a match quantity indicating a quantity of matching object images of the photographed object;

selecting, based on the match quantity, object images from among a plurality of object images that are repeatedly captured according to the photographing cycle; and obtaining a match image, based on the selected object images, and wherein the match quantity decreases as the illuminance according to the illuminance information increases.

19. The method of claim 12, wherein the setting the photographing period comprises setting the photographing period to decrease as the illuminance according to the illuminance information increases, based on the illuminance information.

20. A non-transitory computer-readable recording medium having recorded thereon a program for which is executable by at least one processor of a projecting device to perform of recognizing an object with image projection, the method comprising:

obtaining illuminance information regarding illuminance of an external projection surface of a projected image light;

setting a blocking period during which an output image light is blocked, based on the illuminance information;

setting a photographing period within the blocking period;

blocking the output image light during the blocking period; and photographing the object positioned on the external projection surface during the photographing period.

* * * * *